US010633274B2

(12) United States Patent
De Angelis et al.

(10) Patent No.: US 10,633,274 B2
(45) Date of Patent: *Apr. 28, 2020

(54) APPARATUS AND METHOD FOR HEATING A METALLIC VESSEL

(71) Applicant: Corning Incorporated, Corning, NY (US)

(72) Inventors: Gilbert De Angelis, Lindley, NY (US); Chunhong Chelsie He, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/560,029

(22) PCT Filed: Mar. 18, 2016

(86) PCT No.: PCT/US2016/023006
§ 371 (c)(1),
(2) Date: Sep. 20, 2017

(87) PCT Pub. No.: WO2016/153947
PCT Pub. Date: Sep. 29, 2016

(65) Prior Publication Data
US 2018/0072602 A1 Mar. 15, 2018

Related U.S. Application Data

(60) Provisional application No. 62/136,863, filed on Mar. 23, 2015.

(51) Int. Cl.
*C03B 5/02* (2006.01)
*C03B 5/435* (2006.01)
(Continued)

(52) U.S. Cl.
CPC ............... *C03B 5/435* (2013.01); *C03B 5/02* (2013.01); *C03B 5/033* (2013.01); *C03B 7/07* (2013.01);
(Continued)

(58) Field of Classification Search
CPC .. C03B 5/02; C03B 5/435; C03B 7/09; C03B 7/098; C03B 7/07; F27D 99/0001;
(Continued)

(56) References Cited

U.S. PATENT DOCUMENTS 7,941,038 B2   5/2011   Itoh et al.
8,019,206 B2   9/2011   Hirabara et al.
(Continued)

FOREIGN PATENT DOCUMENTS

CN   102442758 A   5/2012
CN   102442759 A   5/2012
(Continued)

OTHER PUBLICATIONS

International Search Report and Written Opinion of the International Searching Authority; PCT/US2016/023006; dated Sep. 2, 2016; 13 Pages; Korean Intellectual Property Office.
(Continued)

*Primary Examiner* — Cynthia Szewczyk
(74) *Attorney, Agent, or Firm* — Kevin M. Able

(57) ABSTRACT

Disclosed is an apparatus and method of making molten glass. The apparatus includes a vessel for conveying the molten glass and at least one flange configured to supply an electric current to the vessel through the flange, the flange including a first ring extending completely around the vessel in a closed loop, the first ring comprising a first portion including a first thickness and a second portion including a second thickness different from the first thickness, wherein the first portion and the second portion overlap in a plane of the flange such that at least a portion of the first portion is positioned between at least a portion of the second portion and the vessel wall, and neither the first portion nor the
(Continued)

second portion extends completely around the vessel. Also disclosed is a method of making glass using the disclosed flange.

20 Claims, 10 Drawing Sheets

(51) Int. Cl.
- C03B 7/098 (2006.01)
- C03B 7/07 (2006.01)
- H05B 3/03 (2006.01)
- C03B 5/033 (2006.01)
- F27D 99/00 (2010.01)

(52) U.S. Cl.
CPC .......... C03B 7/098 (2013.01); F27D 99/0001 (2013.01); F27D 99/0006 (2013.01); F27D 99/0033 (2013.01); H05B 3/03 (2013.01)

(58) Field of Classification Search
CPC ... H05B 1/00; H05B 3/00; H05B 3/03; H05B 3/06; H05B 3/20; H05B 3/22; H05B 2203/025

See application file for complete search history.

(56) References Cited

U.S. PATENT DOCUMENTS

| | | |
|---|---|---|
| 8,269,131 B2 | 9/2012 | Adelsberg et al. |
| 8,274,018 B2 | 9/2012 | De Angelis et al. |
| 8,796,579 B2 | 8/2014 | Adelsberg et al. |
| 8,857,219 B2 | 10/2014 | De Angelis et al. |
| 2008/0050609 A1 | 2/2008 | Abe et al. |
| 2008/0083250 A1 | 4/2008 | Nagno et al. |
| 2008/0087046 A1* | 4/2008 | Hirabara ............... C03B 5/2252 65/355 |
| 2008/0092597 A1 | 4/2008 | Itoh et al. |
| 2009/0217709 A1 | 9/2009 | Adelsberg et al. |
| 2011/0204039 A1 | 8/2011 | De Angelis et al. |
| 2014/0013806 A1 | 1/2014 | De Angelis et al. |

FOREIGN PATENT DOCUMENTS

| | | |
|---|---|---|
| CN | 203461952 U | 3/2014 |
| JP | 4990230 B2 | 8/2012 |
| JP | 2013075786 A | 4/2013 |
| JP | 2014070001 A | 4/2014 |
| JP | 2014084253 A | 5/2014 |
| WO | 2015057646 A1 | 4/2015 |
| WO | 2016153947 A1 | 9/2016 |

OTHER PUBLICATIONS

European Patent Application No. 16769384.5 Office Action dated Oct. 9, 2018; 8 Pages; European Patent Office.

Siedow et al; "Shape Optimization of Flanges" ; Mathematical Simulation in Glass Technology; pp. 208-236, Jan. 1, 2002.

Chinese Patent Application No. 201680029774.4; English Translation of the First Office Action dated Oct. 30, 2019; China Patent Office; 7 Pgs.

* cited by examiner

APPARATUS AND METHOD FOR HEATING A METALLIC VESSEL

CROSS-REFERENCE TO RELATED APPLICATIONS

This application claims the benefit of priority under 35 U.S.C. § 371 of International Application No. PCT/US16/23006, filed on Mar. 18, 2016, which claims the benefit of priority under 35 U.S.C. § 119(e) of U.S. Provisional Application Ser. No. 62/136,863 filed on Mar. 23, 2015, the contents of which is are incorporated herein in its their entirety by reference.

BACKGROUND

Field

The present disclosure is directed to an apparatus for heating a metallic vessel, and more particularly an apparatus for heating a metallic vessel configured to convey a material, and the material contained therein, by direct electrical heating of the vessel. The material may be, for example, molten glass.

Technical Background

The manufacture of glass on a commercial scale is typically carried out within a refractory ceramic melting furnace wherein raw materials (batch) are added to the melting furnace and heated to a temperature at which the batch undergoes chemical reactions to produce the molten glass. Several methods of heating the batch can be used, including gas-fired burners, an electric current, or both. In a so-called hybrid process, a gas flame from one or more gas-fired combustion burners initially heats the batch. As the temperature of the batch increases and the molten glass is formed, the electrical resistance of the material decreases such that an electric current can be introduced into the molten glass through electrodes mounted in the side walls and/or floor of the melting furnace. The electric current heats the molten glass from within, and the gas burners heat the molten glass from above. In some embodiments submerged combustion can be employed.

Downstream processing of the molten glass, for example fining and homogenizing, can be carried out in certain portions of the furnace structure or in other vessels located downstream from the melting furnace and connected to the melting furnace by conduits. To maintain an appropriate temperature of the molten glass as the molten glass is being conveyed, the molten glass may be heated. In some processes, such as the fining process, the molten glass can be heated in a fining vessel to a temperature greater than the temperature of the molten glass in the melting furnace to facilitate a more complete removal of bubbles from the molten glass. In other portions of the manufacturing apparatus downstream of the melting furnace the molten glass may be cooled while flowing through one or more conduits to bring the molten glass to an appropriate viscosity for forming. However, the cooling may be limited by the controlled addition of heat energy to prevent too rapid a cooling rate.

For the manufacture of optical quality glass, for example glass suitable for use as display glass for the manufacture of display panels used in such devices as televisions, computer monitors, tablets, smart phones and the like, the downstream processing equipment is typically formed from a precious metal, such as a platinum group metal. Platinum and alloys thereof are particularly useful for the manufacture of molten glass processing equipment as it is workable, has a high melting temperature, and exhibits good resistance to corrosion.

Traditionally, metal vessels downstream from the melting furnace, including conduits and other processing equipment, have been heated by external electrical heating elements, for example windings mounted in refractory insulating materials positioned around the vessels. These windings are often platinum windings, or alloys of platinum. While this can be satisfactory for small volume operations, it should be apparent that if the volume of molten glass must be increased, for example on a per hour or per day basis, significant capital expense associated with adding new manufacturing equipment can be avoided by simply increasing the flow rate of molten glass through the processing equipment. However, the increased flow volume may require a greater influx of heat energy to maintain processing temperatures. At some point this becomes difficult to achieve with external heating elements. Accordingly, modern large-scale glass manufacturing of glass articles, and in particular glass articles manufactured by flowing molten glass through precious metal vessels, employs so-called direct heating of the molten glass by establishing an electric current in the vessel itself that heats the vessel and therefore the molten glass within the vessel.

Other considerations include pre-heating the downstream metallic processing equipment during initial system preparation, before molten glass is introduced into the system. Under these conditions, a large current may be required to achieve the requisite temperature prior to the introduction of molten glass into the vessel. Connections to the vessel must be capable of carrying this current without detrimental effects to the vessel or the connection components.

In its most basic embodiment, the downstream process equipment can comprise a metal vessel including at least two flanges connected thereto. The flanges in turn are in electrical communication with an electric current source, and typically include electrode portions intermediate between the flange body and the electric cables or bars (e.g. buses) that deliver the electric current to the flange from the power source. Conventional flange designs may not adequately distribute the current around a perimeter of the vessel, often simply because electric current distribution within the flanges was not considered. If the electric current is poorly distributed, hot spots can be formed around the vessel, either in the flange or the vessel itself. This can be particularly troublesome for non-circular vessels such as conduits with an oblong cross section. Accordingly, what is needed is a flange design that, when the flange is coupled to the vessel, distributes current more uniformly about the vessel, preventing hot spots that may lead to uneven heating of the molten glass therein and possible damage to the equipment.

SUMMARY

Described herein are flanges for attachment to vessels in a glass making apparatus. The flanges function to distribute an electric current to a wall of the vessel to which the flanges are attached, for example a metallic conduit, thereby heating the vessel and molten glass that may be present in the vessel. The flanges according to the present description include a first ring formed with a precious metal capable of withstanding high temperature, such as one of the platinum group metals or an alloy thereof. Suitable precious metals include the platinum group metals platinum, rhodium, iridium, ruthenium, palladium, osmium and alloys thereof. The first ring in accordance with the present disclosure comprises at least two individual portions that may, in some embodiments, differ in thickness. The individual portions may also differ in material such that the individual portions exhibit different electrical resistances. And, whereas the first ring taken as a whole extends around the vessel in a closed loop, neither of the individual portions of the first ring extend completely around the entire vessel. Accordingly, the individual portions are discrete regions, wherein one portion may have a thickness different from (i.e., less than or greater than) another portion. For example embodiments described herein, a straight line infinitely extending from a center of the vessel outward along one angular position may intersect only one portion of the first ring. Yet for another straight line extending along a different angular position, the line may cross a width of both portions of the first ring. Thus, the portions of the first ring overlap in an edge-to-edge fashion (i.e., comprise adjacent, contacting edges) along certain regions of the edges of the portions, but neither portion extends entirely around the vessel.

The plurality of portions contained within the first ring, particularly when the first ring is the innermost ring of the flange, function to direct electric current in a way that avoids a high concentration of electric current along the shortest conduction path between an electrode portion of the flange and the electrode portion of another flange attached to the vessel and spaced apart from the first flange, namely along a path between the electrode and the vessel, and along the vessel wall at a position closest to the electrode portion. For example, if the electrode portions of two spaced-apart flanges are both oriented adjacent the top of the vessel, the shortest conduction path between the flanges is along the top of the vessel. Embodiments of the present disclosure direct electric current toward the sides and the bottom of the vessel, thereby reducing the electric current at the top of the vessel and at the top upper portion of the flange where the flange joins the vessel.

It should be appreciated that the principals and example embodiments disclosed herein, while described in the context of a glass making apparatus, can be directed to other apparatus for processing other materials that are conveyed or contained in metallic vessels.

Accordingly, in one embodiment an apparatus for processing a material is disclosed comprising a vessel comprising a wall, the vessel arranged to convey the material. A flange is attached to the vessel and is configured to deliver an electric current to the vessel wall, the flange comprising a first ring extending completely around the vessel in a closed loop, the first ring comprising a first portion including a first thickness and a second portion including a second thickness different from the first thickness. A cross sectional shape of the vessel in a plane perpendicular to a longitudinal axis of the vessel can be circular or oblong. In some embodiments the vessel can be, for example, a fining vessel. In some embodiments the conveyed material is molten glass.

The first portion and the second portion of the first ring overlap in a plane of the flange (along edges of the first and second portions) such that the first portion is positioned between the second portion and the vessel wall, and neither the first portion nor the second portion extends completely around the vessel. In some embodiments, the thickness of the first portion of the first ring is different than a thickness of the second portion. For example, the thickness of the first portion of the first ring may be less than the thickness of the second portion of the first ring. The first ring may include a seam where the first portion is joined to the second portion, such as by welding.

The flange may further comprise a second ring extending in a closed loop around the first ring. A thickness of the second ring can be greater than the thickness of either one or both of the first or second portions of the first ring. The second ring may be an outermost ring of the flange.

The first ring can comprise a first metal while the second ring comprises a second metal different from the first metal. For example, the first ring may comprise a platinum group metal, or an alloy thereof, such that both the first portion and the second portion comprise the same metal, while second ring may comprise, as examples and not limitation, nickel, copper or alloys thereof. In some embodiments the first ring may be a platinum-rhodium alloy.

In accordance with embodiments of the present disclosure, a first straight radial line extending from and perpendicular to a centerline of the vessel in a plane of the flange may cross the first portion of the first ring without intersecting the second portion of the first ring. The first radial line may be parallel to a minor axis of the vessel.

In some embodiments, the first ring may further comprise a third portion, wherein similar to the first and second portions, the third portion does not extend completely around the vessel. In example embodiments, at least a portion of the third portion may be positioned between the first portion and the second portion.

In another embodiment, an apparatus for making glass is described comprising a vessel including a wall and a flange attached to the vessel. A cross sectional shape of the vessel in a plane perpendicular to a longitudinal axis of the vessel can be circular or oblong. In some embodiments the vessel can be, for example, a fining vessel. The flange is configured to deliver an electric current to the vessel wall. That is, the flange, in contact with the vessel, may be in electrical communication with a suitable power source via cables or busses. The flange can comprise a first ring extending completely around the vessel and attached to the vessel wall in a closed loop, the first ring comprising a first portion including a first thickness and a second portion including a second thickness different from the first thickness. Any one or both of the first portion or the second portion may, however, be of uniform thickness. Neither the first portion nor the second portion extends completely around the vessel and there can be at least one straight radial line extending from and perpendicular to a centerline of the vessel in a plane of the flange that crosses a width of both the first portion and the second portion. The flange may further comprise a second ring extending completely around the first ring in a closed loop The first ring may comprise a first metal such that both the first portion and the second portion comprise the same metal, while the second ring may comprise a second metal different than the first metal. The first ring may include a seam where the first portion is joined to the second portion, such as by welding.

In some embodiments, the second ring contacts the first ring around an entire perimeter of the first ring, and at least portions of both the first portion and the second portions of the first ring contact the second ring.

In still another embodiment, a method is described for making a directly electrically heated vessel comprising an electrical flange configured to supply an electric current to the vessel attached thereto, the electrical flange encircling the vessel in a plane substantially perpendicular to a centerline of the vessel, the method comprising (a) parameterizing the electrical flange, the electrical flange comprising a first ring comprising a first metal and a second ring comprising a second metal different from the first metal, the first ring comprising in a plane of the flange a plurality of radially overlapping portions of different thickness, wherein the first ring comprises first and second portions overlapping along edges thereof, and none of the overlapping portions extend completely around the vessel. The parameterizing can include determining a thickness, a shape and a position of the overlapping portions, (b) calculating, for a total predetermined electric current supplied to the vessel through the flange, a current density in the first ring at a predetermined position, and (c) if a difference between the current density at the predetermined position is greater than a predetermined current density value, then modifying at least one of the size, shape and position of the overlapping portions, then (e) repeating steps (b) and (c) until the electric current density in the first ring is less than the predetermined current density value. The predetermined current density value can be an absolute current density value or a percentage current density value.

Embodiments of the present disclosure can produce, for a vessel comprising adjacent flanges supplied with an electric current, an electric current density at the vessel-flange junction at a position nearest the electrode portion of the flange that can be less than an electric current density at a midpoint between adjacent flanges. This location may, in some examples, be the top of the vessel, wherein the electrode portion extends vertically upward from the flange body in a 12 o'clock position. In other examples, the electrode portion may extend vertically downward relative to the flange body in a 6 o'clock position. In still other examples, the electrode portion may extend horizontally relative to the flange body in a 3 o'clock or 9 o'clock position. It should be apparent that positions intermediate the foregoing positions are also possible. In an example where the electrode portions of adjacent flanges extend vertically upward from the flange bodies in a 12 o'clock position (i.e. near the top of the vessel), on a line extending between the adjacent flanges on a line between the adjacent flanges, for example at the 12 o'clock position, a difference in current density between the maximum current density on the line and a current density at the vessel-flange junction on the line can be equal to or less than 10%, for example equal to or less than 6%, or equal to or less than 5%, for example in a range from about 4% to about 10%, including all ranges and sub-ranges therebetween.

In example embodiments, the maximum current density along a line on the vessel in a circumferential (angular) position nearest the electrode portion of the flanges, e.g. in the 12 o'clock position, occurs within about 20% of the total distance between adjacent flanges, for example equal to or less than about 18%, equal to or less than about 15% or equal to or less than about 13% of the total distance between adjacent flanges at the vessel-flange intersection.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

DETAILED DESCRIPTION

Figure 1:
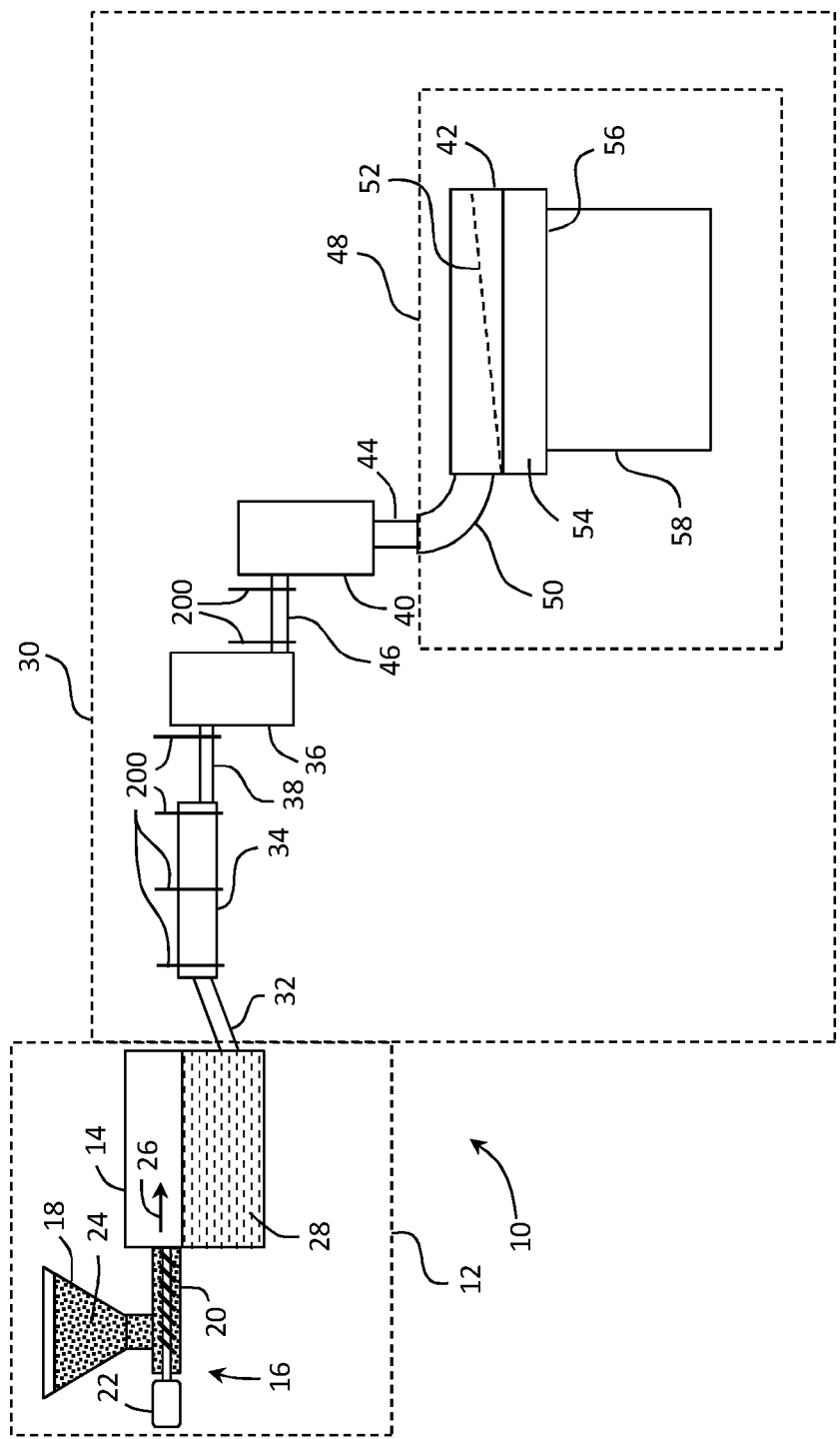
FIG. 1 is a schematic representation of an example glass making apparatus according to embodiments described herein.

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Aspects of the disclosure include apparatus for processing raw materials (i.e., batch) into a molten glass, and more particularly to apparatus for processing the molten glass. Furnaces of the disclosure may be provided for a wide range of applications to heat gases, liquids and/or solids. In one example, apparatus of the present disclosure are described with reference to a glass melting system configured to melt batch into molten glass and convey the molten glass to downstream processing equipment.

Methods of the disclosure may process the molten glass in a wide variety of ways. For instance, the molten glass may be processed by heating the molten glass to a temperature greater than an initial temperature. In further examples, the molten glass may be processed by maintaining a temperature of the molten glass or by reducing the rate of heat loss that might otherwise occur by inputting heat energy into the molten glass and thereby controlling the cooling rate of the molten glass.

Methods of the disclosure may process the molten glass with a fining vessel or with a mixing vessel, for example a stirring vessel. Optionally, the apparatus may include one or more further components such as thermal management devices, electronic devices, electromechanical devices, support structures or other components to facilitate operation of the glass manufacturing apparatus including conveying vessels (conduits) that transport the molten glass from one location to another location.

Shown in FIG. 1 is an example glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat the batch and convert the batch into molten glass. In further examples, glass melting furnace 12 may include thermal management devices (e.g., insulation, heating and/or cooling components) to control a temperature of the molten glass. In still further examples, glass melting furnace 12 may include electronic devices and/or electromechanical devices that facilitate melting of the batch material into a glass melt. Still further, glass melting furnace 12 may include support structures (e.g., support chassis, support member, etc.) or other components.

Glass melting vessel 14 is typically comprised of refractory material, such as a refractory ceramic material. In some examples, glass melting vessel 14 may be constructed from refractory ceramic bricks, for example refractory ceramic bricks comprising alumina or zirconia.

In some examples, the glass melting furnace 12 may be incorporated as a component of a glass manufacturing apparatus used to fabricate a glass ribbon. In some examples, the glass melting furnace of the disclosure may be incorporated as a component of a glass manufacturing apparatus comprising a slot draw apparatus, a float bath apparatus, a down-draw apparatus including a fusion down-draw apparatus, an up-draw apparatus, a press-rolling apparatus, a tube drawing apparatus or other glass ribbon manufacturing apparatus. By way of example, FIG. 1 schematically illustrates glass melting furnace 12 as a component of a fusion down-draw apparatus 10 for fusion drawing a glass ribbon for subsequent processing into glass sheets.

The glass manufacturing apparatus (e.g., the fusion down-draw apparatus 10) can optionally include an upstream glass manufacturing apparatus 16 positioned upstream of glass melting vessel 14 relative to the molten glass direction of flow. In some examples, a portion of, or the entire upstream glass manufacturing apparatus 16, may be incorporated as part of the glass melting furnace 12.

As shown in the illustrated example, the upstream glass manufacturing apparatus 16 can include a batch storage bin 18, a batch delivery device 20 and a motor 22 connected to the batch delivery device. Storage bin 18 may be used to store a quantity of batch 24 that can be fed into melting vessel 14 of glass melting furnace 12, as indicated by arrow 26. In some examples, batch delivery device 20 can be powered by motor 22 to deliver a predetermined amount of batch 24 from the storage bin 18 to melting vessel 14. In further examples, motor 22 can power batch delivery device 20 to introduce batch material 24 at a controlled rate based on a sensed level of molten glass downstream from melting vessel 14. Batch 24 within melting vessel 14 can thereafter be heated to form molten glass 28.

Glass manufacturing apparatus 10 can also optionally include a downstream glass manufacturing apparatus 30 positioned downstream from the glass melting furnace 12 relative to the flow direction of molten glass. In some examples, a portion of the downstream glass manufacturing apparatus 30 may be incorporated as part of glass melting furnace 12. For instance, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, and alloys thereof. For example, downstream components of the glass manufacturing apparatus may be formed from a platinum-rhodium alloy including 70 to 90% by weight platinum and 10 to 30% by weight rhodium.

The downstream glass manufacturing apparatus 30 can include a first conditioning vessel such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34.

Within fining vessel 34, bubbles may be removed from molten glass 28 by various techniques. For example, batch 24 may include multivalent compounds (i.e. fining agents) such as tin oxide that, when heated, undergo a chemical reaction and release oxygen. Other suitable fining agents include without limitation arsenic, antimony, iron and cerium. Fining vessel 34 is heated to a temperature greater than the melting vessel temperature, thereby heating the fining agent. Oxygen bubbles produced by the temperatureinduced chemical reaction of the fining agent(s) rise through the molten glass within the fining vessel, wherein gases in the melt produced in the melting furnace can coalesce or diffuse into the oxygen bubbles produced by the fining agent, causing the oxygen bubbles to enlarge. The enlarged gas bubbles can then rise to a free surface of the molten glass in the fining vessel and thereafter be vented from the fining vessel.

The downstream glass manufacturing apparatus 30 can further include a second conditioning vessel such as a mixing vessel 36 for mixing the molten glass that may be located downstream from the fining vessel 34. The glass melt mixing vessel 36 can be used to provide a homogenous glass melt composition, thereby reducing or eliminating inhomogeneities that may otherwise exist within the fined molten glass exiting the fining vessel. As shown, fining vessel 34 may be coupled to molten glass mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36.

Downstream glass manufacturing apparatus 30 can further include another conditioning vessel, such as delivery vessel 40, located downstream from mixing vessel 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may act to drive molten glass 28 to pass through an interior pathway of third connecting conduit 46 from mixing vessel 36 to delivery vessel 40.

Downstream glass manufacturing apparatus 30 can further include forming apparatus 48 comprising the above-referenced forming body 42 including inlet conduit 50. Exit conduit 44 can be positioned to deliver molten glass 28 from delivery vessel 40 to inlet conduit 50 of forming apparatus 48. In a fusion forming process, forming body 42 can comprise a trough 52 positioned in an upper surface of the forming body and converging forming surfaces 54 that converge along a bottom edge (root) 56 of the forming body. Molten glass delivered to forming body trough 52 via delivery vessel 40, exit conduit 44 and inlet conduit 50 overflows the walls of the trough and descends along converging forming surfaces 54 as separate flows of molten glass. The separate flows of molten glass join below and along root 56 to produce a single ribbon of glass 58 that is drawn from root 56 by applying tension to the glass ribbon, such as by gravity and pulling rolls (not shown), to control the dimensions of the glass ribbon as the glass cools and the viscosity of the molten glass increases such that the glass ribbon 58 goes through a visco-elastic transition and has mechanical properties that give glass ribbon 58 stable dimensional characteristics. The glass ribbon may subsequently be separated into individual glass sheets by a glass separation apparatus (not shown).

Unlike other components of the downstream glass manufacturing apparatus, forming body 42 is typically formed from a refractory ceramic material such as alumina (aluminum oxide) or zirconia (zirconium oxide), although other refractory materials may be used. In some examples, forming body 42 is a monolithic block of ceramic material that has been isostatically pressed and sintered, then machined into the appropriate shape. In other examples, the forming body may be formed by joining two or more blocks of refractory material, e.g. ceramic refractory material. Forming body 42 may include one or more precious metal components configured to direct the flow of molten glass over and from the forming body.

As molten glass 28 travels from the melting vessel 14 to forming body 42, the molten glass is thermally conditioned within the various precious metal vessels through which the molten glass flows. For example, as molten glass 28 travels through the first connecting conduit 32 into fining vessel 34, the molten glass can be heated to a temperature greater than the temperature of the molten glass in the melting vessel to facilitate the fining process. Molten glass 28 can be further heated within the fining vessel as the molten glass flows along the length of the fining vessel. As previously described, the relatively high temperature in the fining vessel relative to the melting vessel both enhances the chemical reaction of the fining agent, thereby increasing the release of oxygen by the fining agent, and reduces the viscosity of the molten glass, thereby facilitating the rise of bubbles entrained within the molten glass to the free surface of the molten glass. Accordingly, first conduit 32 and fining vessel 34 may include flanges for directing an electric current through the walls of the first conduit and the fining vessel, although other vessels of the downstream glass manufacturing apparatus may benefit from such flanges.

As the molten glass is being conveyed from fining vessel 34 to mixing vessel 36 through second conduit 38, a temperature of the molten glass must be prevented from reducing below a temperature at which the molten glass can be easily mixed (homogenized), for example by a stirrer rotatably positioned within the mixing vessel. If the temperature of the molten glass in the mixing vessel becomes too viscous, mixing efficiency can be negatively impacted, thereby reducing the effectiveness of the mixing process in homogenizing the molten glass. Accordingly, second connecting conduit 38 positioned between fining vessel 34 and mixing vessel 36, and the mixing vessel itself, may include flanges that direct an electric current through the walls of the second conduit and the mixing vessel.

Molten glass 28 delivered to forming body 42 by delivery vessel 40 must be of a suitable viscosity to enable forming of the glass ribbon. If a viscosity of the molten glass is too low, applying the appropriate tension to the glass ribbon may become difficult or impossible. If the viscosity is too high, thickness control may become a problem. Moreover, the temperature of molten glass 28 as it flows over forming surfaces 54 of forming body 42 must be controlled to prevent crystallization (devitrification) of both the molten glass itself and to prevent crystallization and precipitation of forming body material that may dissolve into the molten glass as the molten glass flows over the forming surfaces of the forming body. To achieve the proper temperature and viscosity of molten glass 28 as the molten glass is delivered to forming body 42, net heat loss from the molten glass as it travels through third connecting conduit 46 must be sufficiently controlled. Accordingly, third connecting conduit 46 may include flanges to direct an electric current through the wall of the third conduit.

Any or all of the foregoing components of glass manufacturing apparatus 10 can be configured with one or more flanges. The flanges can be configured such that the electric current supplied to the flanges is separately controllable to produce zones of various temperatures. For example, fining vessel 34 may comprise a plurality of flanges, wherein groups of two or more flanges can be controlled to provide zones of different temperatures along the fining vessel. It should be apparent that such zones of different temperatures could be established in any one or more locations along the metallic components of the downstream glass manufacturing apparatus. The following description provides a more detailed discussion of flanges suitable for use within the glass manufacturing apparatus, such as within the downstream glass manufacturing apparatus, including their construction and their operation.

Figure 2:
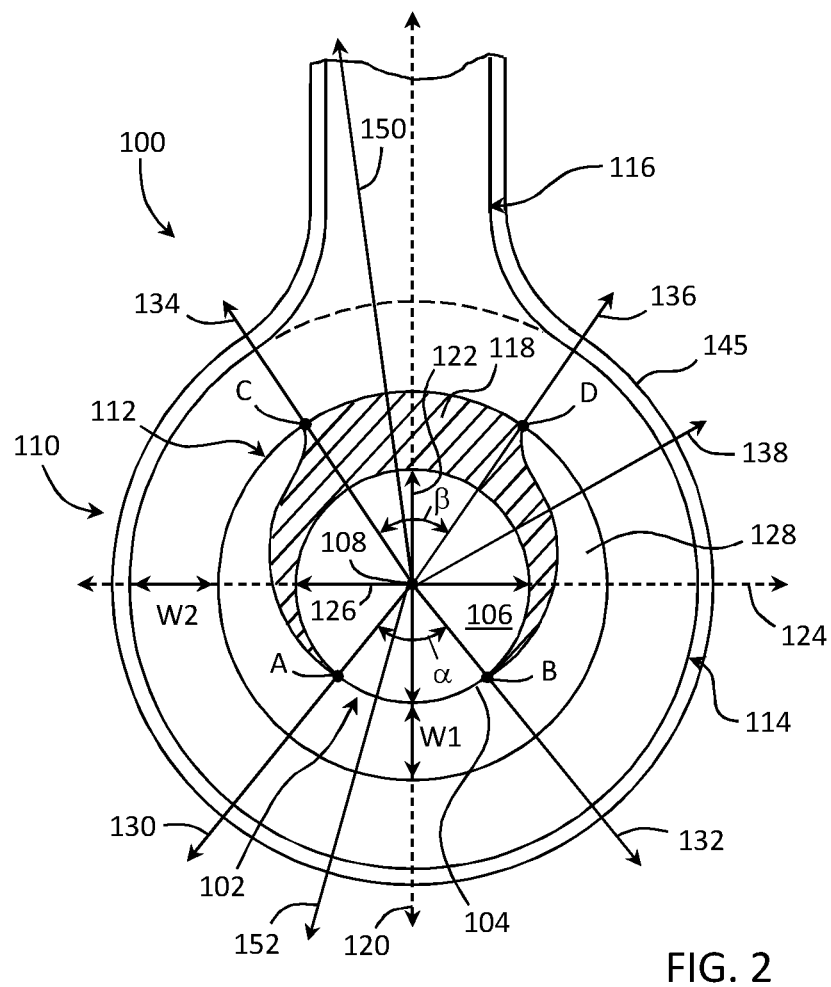
FIG. 2 is a side view of an example flange according to embodiments described herein.

Shown in FIG. 2 is a cross sectional side view of an example flange 100 attached to a vessel 102 according to an embodiment of the present disclosure. Vessel 102 may, for example, be any one of the metallic vessels comprising downstream glass manufacturing apparatus 30 between melting furnace 12 and forming body 42 described above, including without limitation first, second and third conduits 32, 38 and 46, fining vessel 34, mixing vessel 36, delivery vessel 40, exit conduit 44 and inlet 50, or any other metallic vessel or other metallic component conveying molten glass that may comprise glass manufacturing apparatus 10. Vessel 102 comprises a wall 104 that encloses an interior volume 106 that receives a flow of molten glass, and includes a central longitudinal axis 108 extending along a length of the vessel, and a cross sectional shape in a plane of the flange perpendicular to longitudinal axis 108. Longitudinal axis 108 is located at the center of the cross section of the vessel and may also be referred to as vessel centerline 108. The cross sectional shape of vessel 102 may vary in both shape and size in a plane perpendicular to longitudinal axis 108 as a function of position along the length of the vessel (along longitudinal axis 108), but is shown as a circular cross section in the example of FIG. 2. For example, certain conduits within the downstream glass manufacturing apparatus may include transition conduits that form a transition piece from a conduit of one cross sectional shape to another conduit having a different cross sectional shape.

Flange 100 comprises body portion 110 including first ring 112, second ring 114 and an electrode portion 116 attached to an outermost ring of body portion 110. Second ring 114 may, in some examples, be the outermost ring. Electrode portion 116 is directly coupled to the outermost ring, for example second ring 114 as shown in FIG. 2. In some examples, electrode portion 116 may be integral with the outermost ring and formed therewith. In other examples electrode portion 116 may be separately formed and attached to the outermost ring, e.g. second ring 114, such as by welding. As used herein, first ring 112 may be the innermost ring and may be in intimate contact with vessel 102, for example, by welding an inner edge of first ring 112 to vessel wall 104.

In the embodiment shown in FIG. 2, first ring 112 comprises a first metal, which, when first ring 112 is the innermost ring, is compatible with vessel 102 and capable of surviving the high temperature environment at an exterior surface of the vessel (e.g., wall 104) for extended periods of time without significant degradation. For example, first ring 112 may comprise a precious metal, such as a platinum group metal (platinum, rhodium, iridium, ruthenium, palladium and osmium) or alloy thereof, and in some examples may include the same precious metal as vessel 102. For example, first ring 112 may comprise a platinum-rhodium alloy wherein the platinum comprises from about 70% to about 90% of the alloy and rhodium comprises from about 20% to about 30% of the alloy. All of first ring 112 may be formed of the same metal, or first ring 112 may include different metals. For example, first ring 112 may comprise platinum-rhodium alloys in different percentage combinations, or include other alloying materials to modify an electrical resistance of the first ring, to change mechanical properties of the first ring, such as strength or hardness of the first ring, or to obtain any other desired attributes as may be needed and attainable by alloying. First ring 112 further includes a width W1, where width W1, for a circular flange, may be taken along a radial line extending from and perpendicular to longitudinal axis 108. In some embodiments width W1 may vary in respect of angular position about the first ring. In other embodiments, for example the embodiment shown in FIG. 2, width W1 may be angularly constant.

Second ring 114 is spaced apart from wall 104 of vessel 102 and is positioned in a closed loop about first ring 112, and, being more distant from vessel wall 104 than first ring 112 and therefore exposed to a lower temperature than first ring 112, can, if desired, comprise a metal different from the metal or metals used in the manufacture of first ring 112. For example, while first ring 112 can be formed from a precious metal, including platinum group metals or alloys thereof, second ring 114 may be formed from a less expensive and/or less temperature resistant yet electrically conducting metal, such as, for example and not limitation, nickel, copper, molybdenum or alloys thereof. However, as described supra, in some examples second ring 114 may be a platinum-containing ring. Second ring 114 further includes a width W2, where width W2 is taken in a plane of the flange along a line perpendicular to longitudinal axis 108. Width W2 may vary as a function of angular position relative to vessel 102 (e.g. longitudinal axis 108), or width W2 may be substantially constant as a function of angular position relative to vessel 102. In some embodiments, second ring 114 can be joined directly to first ring 112 such as by welding. In other embodiments, second ring 114 may be spaced apart from first ring 112 and not in direct contact with first ring 112. For example, flange 100 may comprise one or more intermediate rings between first ring 112 and second ring 114.

In some embodiments a thickness of the outermost ring, e.g., in a direction perpendicular to a major surface of flange 100 (e.g. parallel to longitudinal axis 108), may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring adjacent electrode portion 116 are thicker than other regions of the outermost ring. Such thicker portions may be adjacent electrode portion 116, but not directly between electrode portion 116 and first portion 118 of first ring 112 (see FIGS. 6, 7 and 8, for example). For example, the thicker portions may be up to or greater than 50% thicker than other portions, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions of the outermost ring aid in steering the electric current supplied to the flange around a circumference of the vessel and minimize, such as eliminate, the formation of hot spots on the outermost ring near electrode portion 116. Such overheating can occur because electric current density is high in and around the electrode portion. The thicker portions of the outermost ring adjacent electrode portion 116, but not between electrode portion 116 and first ring 112, present an increased cross sectional area and therefore a reduced electric current density and decreased temperature due to resistive heating. Thus, a portion of the outermost ring adjacent electrode portion 116 can be thicker than a portion of the outermost ring opposite the electrode portion. As described supra, the outermost ring may be second ring 114. However, in other embodiments, second ring 114 may be a ring intermediate between the outermost ring and first ring 112.

As previously described, first ring 112 extends in a closed loop around vessel 102 and, in the instance where first ring 112 is the innermost ring, first ring 112 may be attached to vessel 102 around an outer perimeter of vessel wall 104 along an inner edge of first ring 112. For example, the inner edge of first ring 112 may be welded to an exterior surface of vessel wall 104. Similarly, in examples such as that illustrated in FIG. 2, an inside edge of second ring 114 can be attached directly to an outside edge of first ring 112. In other examples, as previously described, intervening additional rings, may be positioned between first ring 112 and second ring 114, i.e., between an inside edge of second ring 114 and an outside edge of first ring 112. Such intervening additional rings may comprise a precious metal such as a platinum group metal or alloys thereof. Moreover, additional rings, for example an outermost ring, may be positioned outside of second ring 114.

As further illustrated by FIG. 2, first ring 112 comprises a first portion 118 comprising a first thickness T1. T1 can be, for example, in a range from about 40 mil (about 0.1 cm) to about 50 mil (about 0.13 cm). First portion 118 may, in some embodiments, extend around less than one half the overall perimeter of vessel 102 (less than 180°). In some embodiments, first portion 118 may extend around equal to or greater than one half the overall perimeter of vessel 102 but less than the entire perimeter of vessel 102 (equal to or greater than 180° but less than 360°). For example, consider the vessel depicted in FIG. 2, which comprises a circular cross section, the figure further depicting electrode portion 116 extending vertically away from a top of vessel 102. Although FIG. 2 illustrates only a single electrode portion 166 extending from flange 100 in a direction away from vessel 102, flange 100 may include two or more electrode portions. Further, consider a line 120 perpendicular to longitudinal axis 108 that extends through flange 100 in a plane of the paper (i.e., in a plane of the flange), including through electrode portion 116 and vessel 102, and wherein a first diameter 122 of vessel 102 lies on line 120. Consider also a second line 124 perpendicular to line 120 and extending through and perpendicular to longitudinal axis 108, and wherein a second diameter 126 of vessel 102 lies on line 124. In the illustrated embodiment, line 120 is shown as vertical and orthogonal to line 124 which is shown as horizontal, although orientations other than vertical and horizontal could be applied. In accordance with the embodiment illustrated in FIG. 2, first portion 118 of first ring 112 extends around greater than the entire upper one half of vessel wall 104 relative to horizontal line 124. This is depicted by first portion 118 extending around vessel wall 104 beyond (below) horizontal line 124.

The preceding description can be viewed another way by imagining two radial lines extending perpendicular to and infinitely outward from longitudinal axis (centerline) 108 in a plane of flange 100, first radial line 130 and second radial line 132, wherein first radial line 130 intersects only a single point on first portion 118 on one side of vertical line 120 (point A) and second radial line 132 intersects a different single point on first portion 118 on the opposite side of vertical line 120 (point B). An arc between and bounded by first radial line 130 and second radial line 132 over a region where first portion 118 extends around vessel 102 subtends an angle of 360°−α. In this example the angle α may be less than 180°. Additionally, in the example of FIG. 2, where first ring 112 is the innermost ring, first portion 118 may be in contact with vessel wall 104 over the angle 360°−α. Thus, the angle α may represent a region of the vessel wall 102 about which first portion 118 does not extend or is not in contact with the vessel wall.

It should also be noted that first portion 118 is adjacent electrode portion 116 and on the same side of horizontal line 124 as electrode portion 116. The significance of this point will be explained in more detail further below.

First ring 112 further comprises a second portion 128 comprising a second thickness T2. Second thickness T2 may be different from first thickness T1. For example, second thickness T2 may be greater than first thickness T1. In some embodiments T2 may be in a range from about 80 mil (about 0.2 cm) to about 100 mil (about 0.25 cm). Second portion 128 extends around that portion of vessel wall 104 that first portion 118 does not, e.g. at least over an angular extent of α. In the embodiment illustrated in FIG. 2, second portion 128 is in contact with vessel wall 104 over the angular range of α. In some embodiments, second portion 128 may extend around vessel wall 104 over an angular extent greater than α. Looked at alternatively, imagine two additional radial lines extending perpendicular to and infinitely outward from longitudinal axis (centerline) 108 in a plane of flange 100, third radial line 134 and fourth radial line 136, wherein third radial line 134 intersects only a single point on second portion 128 (point C) and fourth radial line 136 intersects a different single point on second portion 128 (point D) on an opposite side of vertical line 120. It should be noted that in the example flange of FIG. 2, first and second radial lines 130, 132 extend downward relative to horizontal line 124, whereas third and fourth radial lines 134, 136 extend generally upward relative to horizontal line 124. An arc between third radial line 134 and fourth radial line 136 around that region over which second portion 128 extends subtends an angle of 360°−β. Angle β may be an angle less than 180 degrees, and second portion 128 extends around at least that portion of wall 104 defined by 360°−β. In the embodiment shown in FIG. 2, the angle β also denotes the angular extent by which first portion 112 is in contact with an outwardly adjacent ring, e.g. second ring 114. The angular extent by which second portion 128 extends around vessel 102 (360°−β) may be greater than 180 degrees even though in the illustrated embodiment the line of contact between second portion 128 and vessel wall 102 subtends less than 180 degrees (angle α). It should also be recognized that there exists an edge-to-edge overlap between first portion 118 and second portion 128 within a plane of flange 100 and relative to vessel 102. In accordance with FIG. 2, the region of overlap is between first radial line 130 and third radial line 134, and/or between second radial line 132 and fourth radial line 136. Relative to FIG. 2, the angular extent of at least one region of overlap is (360°−α−β)/2 assuming symmetry between the right and left halves of flange 100 about vertical line 120. In the present context, such overlap means that for at least one arbitrary radial line 138 lying in the plane of flange 100 and extending perpendicular to and infinitely outward from longitudinal axis 108, the line will extend across a width of both the first portion 118 and second portion 128. Viewed in terms of movement, if one moves along line 138 in a direction away from longitudinal axis 108, one passes sequentially through first portion 118 and then through second portion 128. Thus, along arbitrary line 138, first portion 118 lies between second portion 128 and vessel wall 104. It should be noted that in other angular orientations, an arbitrary line such as arbitrary line 138 may cross only first portion 118, and in still other orientations line 138 may cross only second portion 128.

Summarizing the foregoing description, first ring 112 extends in a closed loop about vessel 102. First ring 112 comprises at least two portions, first portion 118 and second portion 128, neither of which first or second portion extends individually in a closed loop about vessel 102. First portion 118 and second portion 128 are at least partially nested within first ring 112 in that there is a region of edge-to-edge overlap wherein at least a portion, but not all, of an outside edge of first portion 118 is in contact with a portion, but not all, of an inside edge of second portion 128. Relative to a centerline of the vessel, first portion 118 extends around at least a portion of vessel 102, and may extend over an angle greater than 180 degrees relative to longitudinal axis 108, but less than 360°. Similarly, second portion 128 extends around at least a portion of vessel 102, and may extend over an angle greater than 180 degrees, but less than 360° relative to longitudinal axis 108. In example embodiments, first thickness T1 of first portion 118 may be less than second thickness T2 of second portion 128. In other embodiments, the materials of first portion 118 and second portion 128 may be selected to provide different intrinsic electrical resistances.

It should further be apparent with the aid of FIG. 2 and the foregoing description that there is at least one radial line 150 lying in the plane of flange 100 and extending infinitely outward from and perpendicular to longitudinal axis 108 that, in respect of first ring 112, crosses only first portion 118 and not second portion 128. Radial line 150 may further intersect with electrode portion 116. Similarly, there is at least one radial line 152 lying in the plane of flange 100 and extending infinitely outward from and perpendicular to longitudinal axis 108 that, in respect of first ring 112, crosses only second portion 128 and not first portion 118 and may not intersect an electrode portion.

Figure 3A:
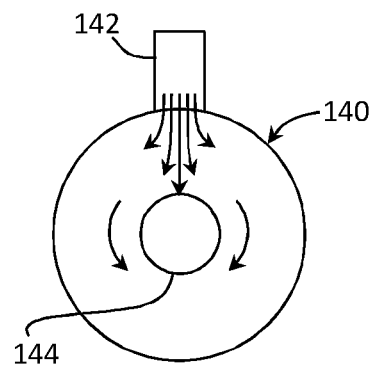
FIG. 3A is a side view of a generic flange showing the effect of current distribution concentrating on a line between an electrode portion and a vessel attached to the flange.
Figure 3B:
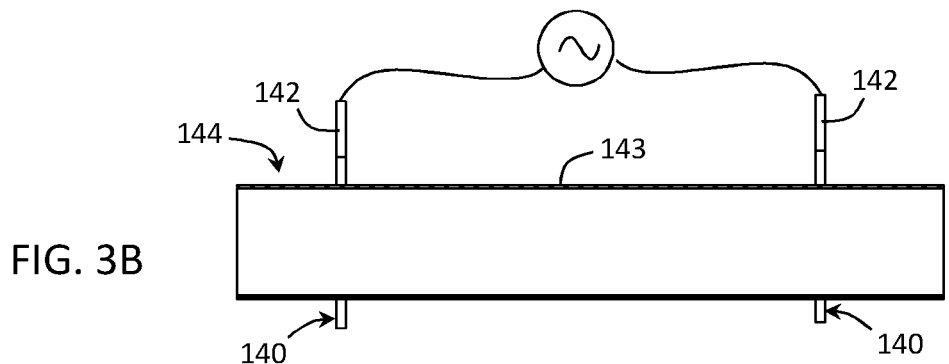
FIG. 3B is a cross sectional side view of a conduit comprising two generic flanges of FIG. 3A.

It was previously noted in reference to FIG. 2, illustrating a single electrode portion 116, that first portion 118 is generally adjacent to electrode portion 116 and on the same side of vessel 102 as electrode portion 116 relative to horizontal line 124. Second portion 128 is oppositely positioned. Consider for the purpose of discussion and not limitation an example generic flange 140 shown in FIG. 3A, wherein flange 140 includes only a single ring and a single electrode portion 142, and for convenience and reference assume electrode portion 142 is vertically oriented and extends upward in a direction away from the top of generic vessel 144. Turning to FIG. 3B, consider also a second flange 140 identical to the first flange 140, and identically oriented, and spaced apart from first flange 140 on vessel 144 along a longitudinal axis thereof. Finally, consider that each of the first and second flanges 140 are connected to an electrical power supply such that an electric current is established between first flange 140 and second flange 140 through vessel 144. In accordance with the present example, the greatest electric current density is along a line downward through the electrode of the first flange into the top of the vessel, as this line represents the shortest path between the electrode and the vessel, where the arrows in FIG. 3A represent electric current and the distance between the arrows represents electric current density (wherein a denser spacing denotes a greater current density). Within the vessel, the greatest electric current density can be found along the top 143 of the vessel between flanges 140, as this represents the shortest path between the top inside portion of the first flange (where the flange joins the vessel) and the top inside portion of the second flange. At the second flange, the situation is the same as with the first flange, in that the greatest electric current density exists along a line extending from the top of vessel 144 to the electrode portions of the respective flanges.

The foregoing phenomenon can result in non-uniform heating of the molten glass flowing through the vessel because certain portions of the vessel carry a different electric current density than other portions of the vessel. More importantly, a significant portion of the electric current is concentrated on a line along the electrode portions and the top of the vessel. This high concentration of electric current along a line along the vessel wall nearest the electrode portions can result in excessive heating of the flange in a region along this line, and in particular near the junction between the flange and that part of the vessel nearest the electrode portions. Excessive heating of selected portions of the flange and/or the vessel can result, in a worst case scenario, in thermal damage (e.g., melting) to the flange or vessel. In addition, non-uniform heating of the molten glass can subsequently result in a non-uniform viscosity such that some regions of the molten glass flowing through the vessel exhibit a different viscosity that other regions of the molten glass. For example, in the case where the vessel 144 is filled with molten glass flowing therethrough, and in a cross section thereof, the bottom portion of the flow of molten glass may be cooler (receive less heating) than the top portion of the flow of molten glass, and therefore exhibit a greater viscosity than the top portion of the flow of molten glass. This can not only perturb the flow of molten glass through the vessel, it may disrupt downstream processes. For example, where the non-uniform heating occurs upstream of and near the stirring vessel, the non-uniform viscosity may interfere with mixing and homogenization. Where the non-uniform viscosity occurs upstream of and near the forming body, non-uniform viscosity can interfere with the forming process and prevent the production of quality glass sheet with uniform thickness.

For certain vessel types, for example vessels not completely filled with molten glass, the foregoing situation can be especially problematic. For example, a fining vessel during operation may be incompletely filled with molten glass and the molten glass therefore comprises a free surface. The volume of the fining vessel not including molten glass comprises a gaseous atmosphere between the free surface of the molten glass and the upper inner surface of the fining vessel. The molten glass flowing through the fining vessel can be a better thermal conductor than the gaseous atmosphere, and when the electrode of the flange is oriented vertically upward, the greatest amount of resistive heating can occur in that portion of the vessel exhibiting the least amount of thermal conduction for at least the foregoing reasons. To wit, the top of the vessel can be damaged by undesirably high temperatures produced by the high electric current density and the concurrent inability of the vessel along the electric current path to radiate or conduct away sufficient heat to avoid damage, owing at least to the relatively poor thermal conduction of the gaseous atmosphere.

It should also be noted that the foregoing difficulty regarding the electric current path can be similarly experienced by the flange itself, since a significant portion of the electric current follows the shortest conduction path between electrode portion 116 and the vessel. Therefore, flange 100 can also suffer from thermal damage resulting from high electrical current density along a line between the electrode portion and the vessel. Accordingly, in some embodiments flange 100 may include a cooling conduit 145, typically placed around a perimeter (e.g., outer edge) of the outermost ring, the cooling conduit configured to carry a cooling fluid, for example air or water.

Even more problematic is an initial pre-heat of the downstream manufacturing apparatus prior to and in preparation for the introduction of molten glass into the apparatus. During this operation a very high electric current may be necessary to achieve proper heating of the apparatus components prior to the introduction of a flow of molten glass. Since under these conditions the entire vessel may be filled with a gaseous atmosphere, certain portions of the vessel wall may be subjected to very high current density and subsequent high temperature.

The flanges described herein in various embodiments mitigate or avoid problems such as those described above by effectively steering the electric current so that the electric current is distributed safely, e.g., away from the shortest conduction path described above. For example, when first portion 118 of first ring 112 that lies on the shortest conduction path as described above is made thinner than other portions of the first ring (e.g., second portion 128), the higher electrical resistance exhibited by the thinner first portion results in a more even distribution of the electric current by effectively steering electric current away from first portion 118. This can result in a lower overall temperature in flange 100, thus avoiding significant hot spots. This is distinctly different than conventional flange designs that utilize thicker regions about the entire perimeter of the vessel, either in the vessel itself or in that portion of the flange directly attached to the vessel, as a means to accommodate greater electric current. Accordingly, as described in respect of FIG. 2, first ring 112 includes at least a first portion near electrode portion 116, and therefore on the shortest conduction path between electrode portion 116 and vessel 102, that is thinner than the rest of the first ring. Moreover, modeling has shown that the edge-to-edge overlapping configuration of the first and second portions 118, 128 may not only steer the electric current to reduce the electric current density at the near-electrode portion of the flange and/or vessel, but may contribute to the uniformity of the electric current about a significant portion of, or the entirety of vessel 102 where first ring 112 may be attached. It should be noted that the description of first ring 112, even when attached to vessel 102, discounts the presence of the weld material that may be positioned between first ring 112 and vessel wall 104, and that the weld material per se has minimal effect on electric current distribution to the vessel. It should also be noted that throughout the present description, the term "ring" is intended to represent a closed arcuate shape, and not necessarily a circular shape. Thus, the term ring may refer to any closed form and the foregoing description is applicable to non-circular vessel and flange designs as will be discussed more fully hereinbelow.

Figure 4:
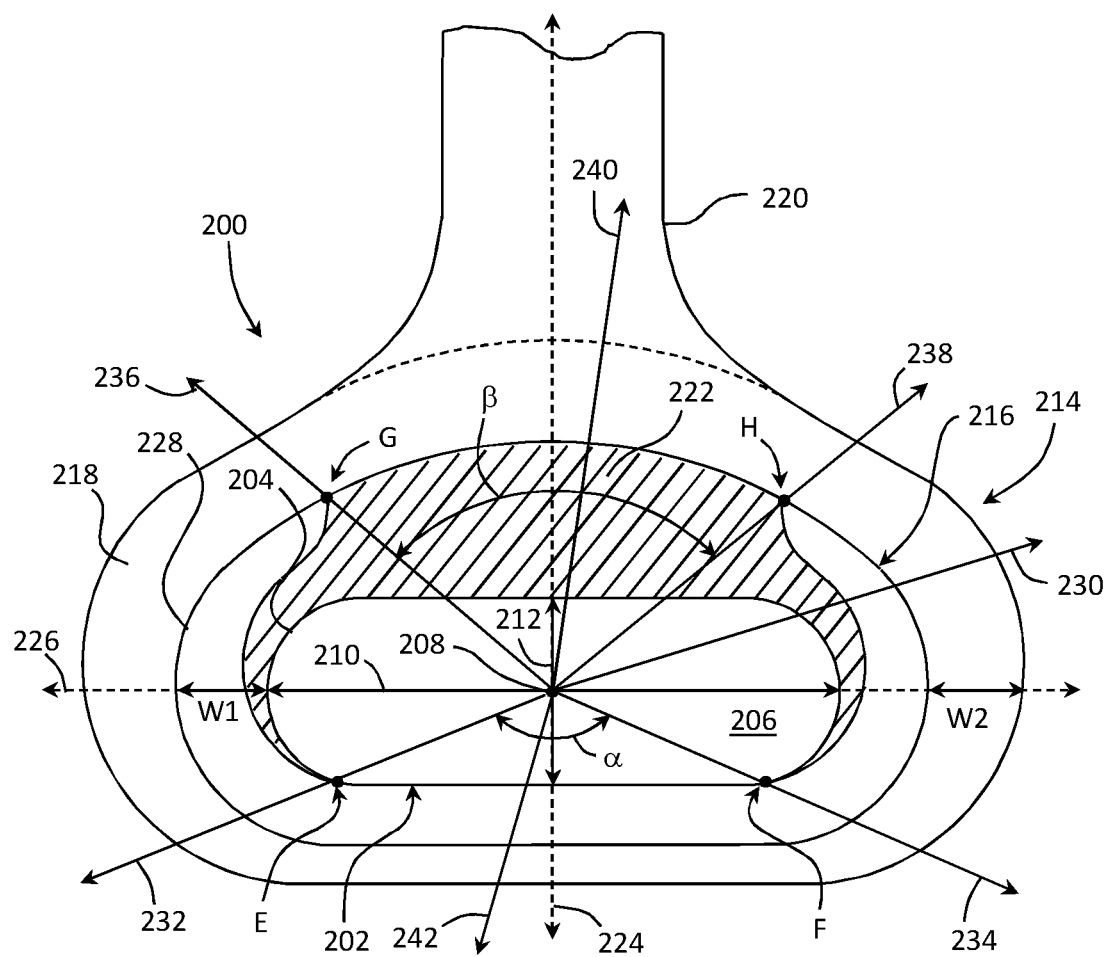
FIG. 4 is a side view of another example flange according to embodiments described herein.

Shown in FIG. 4 is a cross sectional front view of another example flange 200 attached to a vessel 202. Vessel 202 may be any one of the vessels comprising downstream glass manufacturing apparatus 30 described above, including first, second and third conduits 32, 38 and 46, fining vessel 34, mixing vessel 36, delivery vessel 40, exit conduit 44 and inlet 50, or any other metallic vessel that conveys molten glass that may comprise glass manufacturing apparatus 10. Vessel 202 includes a wall 204 defining an interior volume 206. Vessel 202 further includes a longitudinal axis 208 extending along a length of the vessel at a center thereof, and a cross sectional shape in a plane of the flange perpendicular to longitudinal axis 208. The cross sectional shape may vary in both shape and size as a function of position along the length of the vessel, but is shown as an oblong shape in the example of FIG. 4. By oblong shape what is meant is a shape including a long (major) axis 210 and a short (minor) axis 212, both of which are perpendicular to longitudinal axis 208, wherein the major axis is longer than the minor axis. The oblong cross sectional shape may be oval, elliptical, rectangular or a combination of these or other shapes. For example, the oblong cross sectional shape illustrated in the example of FIG. 4 comprises a generally rectangular shape with two arcuate end portions, such as two semicircular end portions.

Flange 200, similar to flange 100, comprises a body portion 214 including a first ring 216, a second ring 218 and an electrode portion 220 attached to an outermost ring. Second ring 218 may, in some examples, be the outermost ring wherein electrode portion 220 is directly coupled to second ring 218 as shown. For example, electrode portion 220 may be integral with second ring 218 and formed therewith. In some examples electrode portion 220 may be separately formed and attached to the outermost ring, e.g. second ring 218, such as by welding. First ring 216 is positioned between second ring 218 and vessel 202 and may be the innermost ring and in intimate contact with vessel wall 204. For example, first ring 216 may be welded to vessel wall 204 around an inner edge of first ring 216

In the embodiment shown in FIG. 4, first ring 216, particularly if configured as the innermost ring, may comprise a first metal that is compatible with vessel 202 and capable of surviving the high temperature environment at the surface of the vessel for extended periods of time without significant degradation. For example, first ring 216 may comprise a precious metal, such as a platinum group metal or alloys thereof as previously described, and in some examples may include the same precious metal as vessel wall 204. All of first ring 216 may be formed of the same metal, or first ring 216 may include different metals. Such different metals may include alloys of the same elements but in different proportions. For example, first ring 216 may utilize metals with different electrical resistances in different areas of the ring to tailor the resistance of regions of the first ring in a manner that may be used with or without thickness differences. For example, first ring 216 may include regions of a first metal having a high electrical resistance, and other regions of lower electrical resistance. First ring 216 may comprise a smoothly curved and continuous outer perimeter (edge), and further includes a width W1. Width W1 may be constant, or width W1 may vary as a function of angular position around vessel 202.

Second ring 218 is spaced apart from wall 204 of vessel 202 and can comprise a metal different from the metal or metals used in the manufacture of first ring 216. For example, while first ring 216 can be formed from a precious metal, including the platinum group metals or alloys thereof, second ring 218 can be formed from a less expensive electrical conductor, such as for example and not limitation, nickel, copper, molybdenum or alloys thereof. Second ring 218 further includes a width W2. Width W2 may be constant, or width W2 may vary as a function of angular position around vessel 202.

In the instance where first ring 216 is an innermost ring and connected to vessel wall 104, an inner edge of first ring 216 can be attached to vessel wall 204 and extend in a closed loop around vessel 202. For example, the inner edge of first ring 216 may be welded to vessel wall 204. Similarly, in the example illustrated in FIG. 4, an inside edge of second ring 218 can be attached to an outside edge of first ring 216. In some examples, intervening additional rings may be positioned between first ring 216 and second ring 218. In some examples, second ring 218 may be an outermost ring. However, in other examples additional rings may be positioned outside of second ring 218, for example an outermost ring, or additional rings may be positioned inside first ring 216 between first ring 216 and vessel wall 204.

In some embodiments, a thickness of the outermost ring, whether the outermost ring is second ring 218 or not, may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring adjacent electrode portion 220 are thicker than other regions of the outermost ring. Such thicker portions may be adjacent electrode portion 220, but not directly between electrode portion 220 and first portion 222 of first ring 216 (see FIGS. 6, 7 and 8, for example). For example, the thicker portions may be up to or greater than 50% thicker than other portions, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions of the outermost ring aid in steering the electric current around a circumference of the vessel and minimize, such as eliminate, the formation of hot spots on the outermost ring near electrode portion 220. Such overheating can occur because electric current density is high in and around the electrode portion. The thicker portions of the outermost ring adjacent electrode portion 220, but not directly between electrode portion 220 and first ring 216, present an increased cross sectional area and therefore provide for a reduced electric current density. Thus, a portion of the outermost ring adjacent electrode portion 220 can be thicker than other portions of the outermost ring, such as a portion of the outermost ring opposite the electrode portion. As described supra, the outermost ring may be second ring 218. However, in other embodiments, second ring 218 may be a ring intermediate between the outermost ring and first ring 216, or intermediate between the outermost ring and the vessel wall 204.

As further illustrated by FIG. 4, first ring 216 comprises a first portion 222 comprising a first thickness T1. First portion 222 extends around a portion of wall 204, and can extend over an arc less than one half the overall perimeter of vessel 202 (less than 180°) in a plane of the flange. In other embodiments, first portion 222 can extend around a portion of wall 204 equal to or greater than one half the overall perimeter of vessel 202 (equal to or greater than 180°) in a plane of the flange, but less than the entire perimeter (less than 360°). For example, consider the oblong vessel depicted in FIG. 4 wherein electrode portion 220 extends vertically away from vessel 202. Further consider an infinitely extending vertical line 224 in a plane of flange 200 that extends through and perpendicular to longitudinal axis 208, and in which lies within electrode portion 220. For example, in an embodiment where electrode portion 220 is vertically extending, vertical line 220 may bisect flange 200, and vessel 202, into symmetric right and left halves, and wherein short (minor) axis 212 of vessel 202 lies on vertical line 224. Consider also an infinitely extending horizontal line 226 lying in the plane of flange 200, horizontal line 226 being perpendicular to vertical line 224 and intersecting vertical line 224 at longitudinal axis 208, wherein long (major) axis 210 of vessel 202 lies on horizontal line 226. In accordance with the embodiment illustrated in FIG. 4, first portion 222 may extend around greater than one half of a perimeter of vessel wall 204 but less than the entire perimeter. For example, first portion 222 may be in contact with greater than one half of a perimeter of vessel wall 204, but less than the entire perimeter. This is shown in the illustrated embodiment where first portion 222 extends around vessel wall 204 over the entire upper one half of the wall and extends downward on the wall beyond the long axis on both right and left sides of the vessel. As illustrated in the embodiment of FIG. 4, first ring 216 may be the innermost ring and first portion 222 is in contact with or extends around vessel wall 204 greater than one half of a perimeter of vessel wall 204 but less than the entire perimeter. This can be viewed another way by noting that first portion 222 can be in contact with (or extend around) vessel wall 204 over an arc greater than 180 degrees. It should also be noted that first portion 222 is adjacent electrode portion 220 and on the same side of horizontal line 226 as electrode portion 220 (using horizontal line 226 as a boundary between the top side and the bottom side). However, in some embodiments first portion 222 may extend around vessel 202 less than 180 degrees.

First ring 216 further comprises a second portion 228 comprising a second thickness T2. Second thickness T2 may be different than first thickness T1. In the illustrated embodiment of FIG. 4, second portion 228 may be in contact with that portion of vessel wall 204 that first portion 222 is not. Looked at alternatively, if first portion 222 is in contact with vessel wall 204 over an angular extent of 360°−α, where α is less than 180 degrees, then second portion 228 may be in contact with vessel wall 204 over an angular extent a. However, it is also apparent from FIG. 4 that second portion 228 may extend around vessel 202 beyond the line of contact between first portion 222 and vessel wall 204. Thus, the angular extent by which second portion 228 extends around vessel 202 may be greater than 180 degrees even though a line of contact between second portion 228 and vessel wall 204 subtends less than 180 degrees. This results in an edge-to-edge overlap between first portion 222 and second portion 228 within a plane of flange 200. In the present context, such overlap means that for at least one arbitrary radial line 230 lying in the plane of flange 200 and extending infinitely outward from longitudinal axis 208, arbitrary radial line 230 will extend separately across both first portion 222 and second portion 228. Viewed in terms of movement, if one moves along arbitrary line 230 in a direction away from vessel wall 204, one passes sequentially through first portion 222, and then through second portion 228. In the region of overlap, a portion of the outside edge of first portion 222 is in contact with a portion of the inside edge of second portion 228 such that a portion of first portion 222 is between a portion of second portion 228 and vessel wall 204 in a plane of flange 200.

From the foregoing description it can be observed that first ring 216 extends in a closed loop about vessel 202 and that first ring 216 comprises at least two portions 222, 228. Neither portion 222 or 228 extends completely around the vessel. These portions 222, 228 are nested in that there is a region of edge-to-edge overlap wherein an outside edge of first portion 216 is in contact with an inside edge of second portion 228. Looked at yet another way, consider in a plane of flange 200 a radial line 232 extending perpendicular to and infinitely outward from longitudinal axis 208 and intersecting only a single point of first portion 222 (point E). Consider also radial line 234 extending perpendicular to and infinitely outward from longitudinal axis 208 and intersecting another single point F of first portion 222 on an opposite side of vertical line 224. An arc between first and second radial lines 232, 234 may subtend an angle α less than 180 degrees, and first portion 222 extends around vessel 202 at least by an angle of 360°−α. Similarly, consider radial line 236 extending perpendicular to and infinitely outward from longitudinal axis 208 and intersecting only a single point G of second portion 228. Consider also radial line 238 extending perpendicular to and infinitely outward from longitudinal axis 208 and also intersecting only a single point H of second portion 228 different from point G. An arc between third and fourth radial lines 236 and 238 may subtend an angle β less than 180 degrees, and second portion 228 extends around vessel 202 at least by an angle of 360°−β. In example embodiments the thickness T1 of first portion 222 can be less than a thickness T2 of second portion 228. In some embodiments, the materials of first portion 222 and second portion 228 may be selected to provide different intrinsic electrical resistances. For instance, the material of first portion 222 may be selected to provide first portion 222 with an electrical resistance greater than second portion 228. Alternatively, the material of second portion 228 may be selected to provide second portion 228 with an electrical resistance greater than first portion 222.

It should be apparent with the aid of FIG. 4 and the foregoing description that there is at least one radial line 240 lying in the plane of flange 200 and extending infinitely outward from and perpendicular to longitudinal axis 208 that, in respect of first ring 216, crosses only first portion 222 and not second portion 228. Radial line 240 may further intersect with electrode portion 220. Similarly, there is at least one radial line 242 lying in the plane of flange 200 and extending infinitely outward from and perpendicular to longitudinal axis 208 that, in respect of first ring 216, crosses only second portion 228 and not first portion 222.

Figure 5:
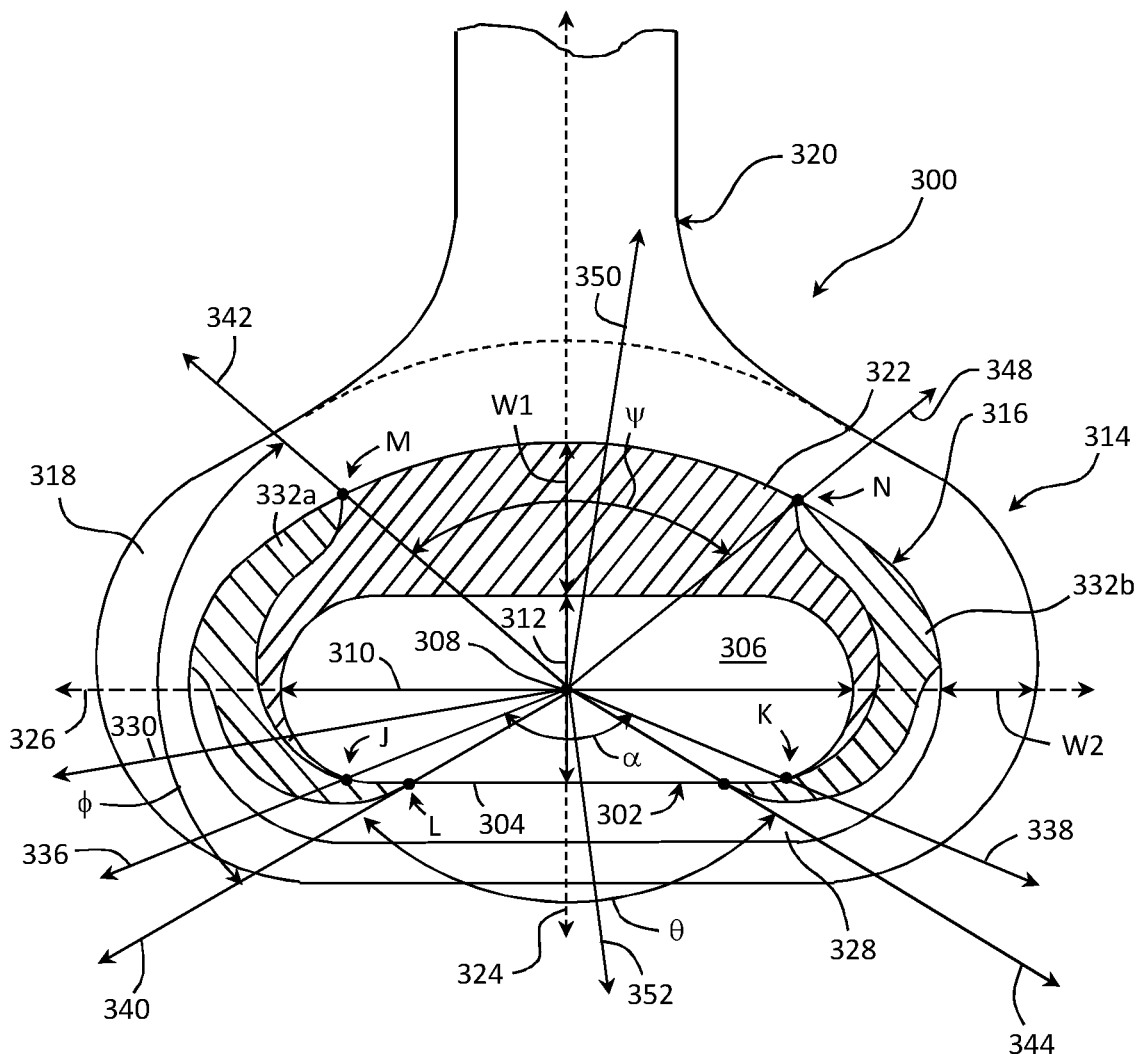
FIG. 5 is a side view of yet another example flange according to embodiments described herein.

In still another embodiment illustrated in FIG. 5, another example flange 300 is shown attached to a vessel 302. Vessel 302 may be any one of the vessels comprising downstream glass manufacturing apparatus 30 described above, including first, second and third conduits 32, 38 and 46, fining vessel 34, mixing vessel 36, delivery vessel 40, exit conduit 44 and inlet 50, or any other metallic vessel that conveys molten glass and comprises glass manufacturing apparatus 10. Vessel 302 includes a wall 304 defining an interior volume 306. Vessel 302 further includes a central longitudinal axis 308 extending along a length of the vessel, and a cross sectional shape in a plane of the flange perpendicular to longitudinal axis 308. The cross sectional shape may vary in both shape and size as a function of position along the length of the vessel, but is shown as an oblong shape in the example of FIG. 5. In other embodiments the oblong cross sectional shape may be oval, elliptical, rectangular or a combination of these or other shapes. For example, the oblong cross sectional shape illustrated in FIG. 5 comprises a generally rectangular shape with two arcuate end portions, such as two semicircular end portions.

Flange 300, similar to flanges 100 and 200, comprises a body portion 314 including a first ring 316, a second ring 318 and an electrode portion 320 attached to an outermost ring. Second ring 318 may, in some examples, be the outermost ring wherein electrode portion 320 may be directly coupled to second ring 318 as shown. For example, electrode portion 320 may be integral with second ring 318 and formed therewith. In some examples, electrode portion 320 may be separately formed and attached to the outermost ring, e.g., second ring 318, such as by welding. First ring 316 may, in some embodiments, be the innermost ring and in intimate contact with vessel wall 304.

In some embodiments a thickness of the outermost ring may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring adjacent electrode portion 320 are thicker than other regions of the outermost ring. Such thicker portions may be adjacent electrode portion 320, but not directly between electrode portion 320 and first portion 322 of first ring 316 (see FIGS. 6, 7 and 8, for example). For example, the thicker portions may be up to or greater than 50% thicker than other portions, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions of the outermost ring aid in steering the electric current around a circumference of the vessel and minimize, such as eliminate, the formation of hot spots on the outermost ring near electrode portion 320. Such overheating can occur because electric current density is high in and around the electrode portion. The thicker portions of the outermost ring adjacent electrode portion 320, but not directly between electrode portion 320 and first ring 316, present an increased cross sectional area and therefore provide for a reduced electric current density. Thus, a portion of the outermost ring adjacent the electrode can be thicker than other portions of the outermost ring, for example a portion of the outermost ring opposite electrode portion 320. As described supra, the outermost ring may be second ring 318. However, in other embodiments, second ring 318 may be a ring intermediate between the outermost ring and first ring 316, or intermediate between the outermost ring and the vessel wall 304.

In the embodiment shown in FIG. 5, first ring 316 may comprise a first metal that is compatible with vessel 302 and capable of surviving the high temperature environment at the surface of the vessel for extended periods of time without significant degradation. For example, first ring 316 may comprise a precious metal, such as a platinum group metal or alloys thereof, and in some examples may include the same precious metal as vessel wall 304. All of first ring 316 may be formed of the same metal, or first ring 316 may include different metals. Such different metals may include alloys of the same elements but in different proportions. First ring 316 further includes a width W1. Width W1 may be constant, or W1 may vary as a function of angular position around vessel 302. First ring 316 may in some embodiments comprise a smoothly curved and continuous outer perimeter.

Second ring 318 is spaced apart from wall 304 of vessel 302 and accordingly second ring 318 can comprise a metal different from the metal or metals used in the manufacture of first ring 316. For example, while first ring 316 can be formed from a precious metal, including the platinum group metals or alloys thereof, second ring 318 can be formed from a less expensive electrical conductor, such as for example and not limitation, nickel, copper, molybdenum or alloys thereof. Second ring 318 further includes a width W2. Width W2 may be constant, or width W2 may vary as a function of angular position around vessel 302.

In the instance where first ring 316 is an innermost ring, an inner edge of first ring 316 can be attached to vessel wall 304 in a closed loop around vessel 302. For example, the inner edge of first ring 316 may be welded to vessel wall 304. Similarly, in the example illustrated in FIG. 5, an inside edge of second ring 318 can be attached to an outside edge of first ring 316. In other examples, intervening additional rings may be positioned between first ring 316 and second ring 318. Moreover, additional rings, such as an outermost ring, may be positioned outside of second ring 318 or inside first ring 316 such as between first ring 216 and vessel wall 304.

As further illustrated by FIG. 5, first ring 316 comprises a first portion 322 comprising a first thickness T1. First portion 322 can extend around a portion of wall 304 for less than one half the overall perimeter of vessel 302 (less than 180°) in a plane of the flange. In other embodiments, first portion 322 can extend around a portion of wall 304 equal to or greater than one half the overall perimeter of vessel 302 (equal to or greater than 180°) in a plane of the flange, but less than the entire perimeter (less than 360°). For example, consider the oblong vessel depicted in FIG. 5 wherein electrode portion 320 extends vertically away from vessel 302. Further consider an infinitely extending vertical line 324 that bisects flange 300 including electrode portion 320, and vessel 302, into symmetric right and left halves, and wherein short (minor) axis 312 of vessel 302 lies on vertical line 324. Consider also an infinitely extending horizontal line 326 perpendicular to vertical line 324 and wherein long (major) axis 310 of vessel 302 lies on horizontal line 326. In accordance with the embodiment illustrated in FIG. 5, first portion 322 can extend around greater than one half of a perimeter of vessel wall 304 (greater than 180°) in a plane of the flange but less than the entire perimeter (less than 360°). For example, first portion 322 may be in contact with greater than one half of a perimeter of vessel wall 304, but less than the entire perimeter. This is shown in the illustrated embodiment where first portion 322 extends around vessel wall 304 over the entire upper one half of the wall and extends downward on the wall beyond the long axis on both right and left sides of the vessel. In the embodiment of FIG. 5, first ring 316 is the innermost ring and first portion 322 is in contact with vessel wall 304 for greater than one half of a perimeter of vessel wall 304 but less than the entire perimeter. It should also be noted that first portion 322 is adjacent electrode portion 320 and on the same side of horizontal line 326 as electrode portion 320.

First ring 316 further comprises a second portion 328 comprising a second thickness T2. Second thickness T2 may be the same or different than first thickness T1. In the illustrated embodiment of FIG. 5, second portion 328 can extend around a portion of wall 304 for less than one half the overall perimeter of vessel 302 (less than 180°) in a plane of the flange. In other embodiments, second portion 328 can extend around a portion of wall 304 equal to or greater than one half the overall perimeter of vessel 302 (equal to or greater than 180°) in a plane of the flange, but less than the entire perimeter (less than 360°). Second portion 328 can be in contact with at least a portion of vessel wall 304 that first portion 322 is not in contact with. Looked at alternatively, if first portion 322 is in contact with vessel wall 304 over an angular extent of 360°−α, where α is less than 180 degrees, then second portion 328 may be in contact with vessel wall 304 over an angular extent equal to or less than α. However, it is also apparent from the embodiment of FIG. 5 that second portion 328 may extend around vessel 302 beyond the line of contact between first portion 322 and vessel wall 304. Thus, the angular extent by which second portion 328 can extend around vessel 302 can be greater than 180 degrees even though the line of contact between second portion 328 and vessel wall 304 subtends less than 180 degrees.

First ring 316 may further comprise a third portion, which, unlike first and second portions 322, 328, may be divided into two discrete sub-portions, sub-portion 332a and sub-portion 332b, wherein each of sub-portions 332a and 332b extend around at least a portion of vessel wall 304 and each have a thickness T3. The two sub-portions 332a and 332b may be oppositely and symmetrically positioned about vertical line 324. In some embodiments sub-portions 332a and 332b may be positioned between first portion 322 and second portion 328. Third thickness T3 may be less than second thickness T2 but greater than thickness T1, e.g. T1<T3<T2.

In some embodiments, the inner edge of first ring 316 may be attached to vessel wall 304 and extend in a closed loop around vessel 302. For example, the inner edge of first ring 316 may be welded to vessel wall 304. Similarly, in the example illustrated in FIG. 5, the inside edge of second ring 318 can be attached to the outside edge of first ring 316.

As also shown in FIG. 5, there is an edge-to-edge overlap between first portion 322 and sub-portions 332a and 332b within a plane of flange 300. Such overlap means that for at least one arbitrary radial line 330 extending infinitely outward from and perpendicular to longitudinal axis 308 and lying in the plane of flange 300, arbitrary radial line 330 will extend separately across both first portion 322 and at least one of sub-portion 332a or sub-portion 332b. In addition, there is an edge-to edge overlap between sub-portions 332a and 332b and second portion 328 such that radial line 330 extends across both second portion 328 and at least one of sub-portion 332a and 332b. Finally, there is overlap between first portion 322 and second portion 328, although not an edge-to-edge (contacting) overlap, wherein radial line 330 extends across a width of first portion 322 and a width of second portion 328. Thus, radial line 330 crosses all three portions of first ring 316, e.g. 322, 328 and 332a and/or 332b.

Looked at yet another way, consider in a plane of flange 300 a radial line 336 extending perpendicular to and infinitely outward from longitudinal axis 308 and intersecting only a single point of first portion 322 (point J) relative to vessel 302. Consider also radial line 338 extending infinitely outward from and perpendicular to longitudinal axis 208 and intersecting another single point (point K) of first portion 322 on an opposite side of vertical line 324. An arc between radial lines 336, 338 subtends an angle α less than 180 degrees, and first portion 322 extends around vessel 302 at least by an angle of 360°−α. Similarly, consider radial line 340 extending perpendicular to and infinitely outward from longitudinal axis 308 and intersecting only a single point (point L) of sub-portion 332a. Consider also radial line 342 extending perpendicular to and infinitely outward from longitudinal axis 308 and also intersecting only a single point (point M) of sub-portion 332a. An arc between radial lines 340 and 342 subtends an angle φ less than 180 degrees, and at least a portion of sub-portion 332a (or 332b) may be positioned between second portion 328 and vessel wall 304. Indeed, at least a portion of sub-portion 332a may be positioned between second portion 328 and first portion 322.

Finally, consider an additional radial line 348 intersecting only a single point (point N) of sub-portion 332b on the same side of horizontal line 326 but on the opposite side of vertical line 324. An arc between radial lines 342 and 348 subtends an angle ψ less than 180 degrees, and may define the angular extent by which first portion 322 is in contact with second ring 318. Similarly, an arc between radial lines 340 and 344 can subtend an angle θ less than 180 degrees, and may define the angular extent by which second portion 328 is in contact with vessel wall 304.

It should further be apparent with the aid of FIG. 5 and the foregoing description that there is at least one radial line 350 lying in the plane of flange 300 and extending infinitely outward from and perpendicular to longitudinal axis 308 that, in respect of first ring 316, crosses only first portion 322 and not second portion 328 nor sub-portion 332a or 332b. Radial line 350 may further intersect with electrode portion 320. Similarly, there is at least one radial line 352 lying in the plane of flange 300 and extending infinitely outward from and perpendicular to longitudinal axis 308 that, in respect of first ring 316, crosses only second portion 328 and not first portion 322 nor sub-portion 332a or 332b.

Figure 6:
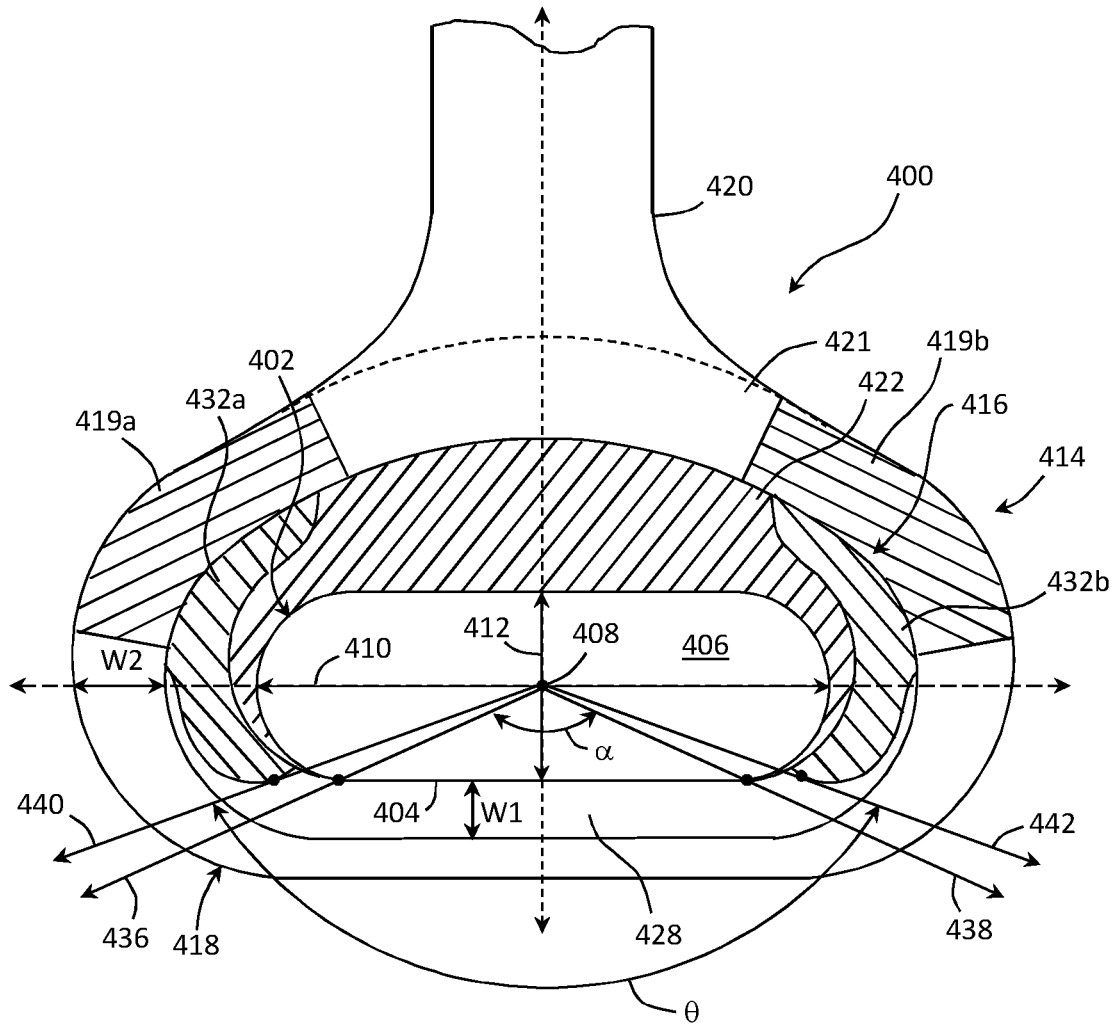
FIG. 6 is a side view of still another example flange according to embodiments described herein.

In yet another embodiment illustrated in FIG. 6, another example flange 400 is shown attached to a vessel 402. Vessel 402 may be any one of the vessels comprising downstream glass manufacturing apparatus 30 described above, including first, second and third conduits 32, 38 and 46, fining vessel 34, mixing vessel 36, delivery vessel 40, exit conduit 44 and inlet 50, or any other metallic vessel that conveys molten glass and comprises glass manufacturing apparatus 10. Vessel 402 includes a wall 404 defining an interior volume 406. Vessel 402 further includes a central longitudinal axis 408 extending along a length of the vessel, and a cross sectional shape in a plane perpendicular to longitudinal axis 408. The cross sectional shape may vary in both shape and size as a function of position along the length of the vessel, but is shown as an oblong shape in the example of FIG. 6. The cross sectional shape of FIG. 6 comprises a long (major) axis 410 and a short (minor) axis 412, both of which are perpendicular to longitudinal axis 408 and to each other. The oblong cross sectional shape may be oval, elliptical, rectangular or a combination of these or other shapes. For example, the oblong cross sectional shape illustrated in FIG. 6 comprises a generally rectangular shape with two arcuate end portions, such as two semicircular end portions.

Flange 400, similar to flanges 100, 200 and 300, comprises a body portion 414 including a first ring 416 and a second ring 418, and an electrode portion 420 attached to an outermost ring. Second ring 418 may, in some examples, be the outermost ring wherein electrode portion 420 may be directly coupled to second ring 418 as shown. For example, electrode portion 420 may be integral with second ring 418 and formed therewith. In some examples, electrode portion 420 may be separately formed and attached to the outermost ring, e.g. second ring 418, such as by welding. First ring 416 may be the innermost ring and in intimate contact with vessel wall 404. For example, innermost ring 416 may be welded to vessel wall 404 around an inner edge of first ring 416.

In some embodiments a thickness of the outermost ring may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring adjacent electrode portion 420 are thicker than other regions of the outermost ring. For example, portions 419a and 419b of the outermost ring of the embodiment of FIG. 6, which in the illustrated embodiment is also second ring 418, may be thicker than portion 421 of the outermost ring directly between electrode portion 420 and first ring 416. For example, portions 419a and 419b may be up to or greater than 50% thicker than portion 421, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions of the outermost ring aid in steering the electric current around a circumference of the vessel and minimize, such as eliminate, the formation of hot spots on the outermost ring near electrode portion 420. Such overheating can occur because electric current density is high in and around the electrode portion. The thicker portions of the outermost ring adjacent electrode portion 420, but not directly between electrode portion 420 and first ring 416, present an increased cross sectional area and therefore provide for a reduced current density. Thus, a portion of the outermost ring adjacent electrode portion 420 can be thicker than other portions of the outermost ring, for example a portion 421 of the outermost ring opposite electrode portion 420. As described supra, the outermost ring may be second ring 418. However, in other embodiments, second ring 418 may be a ring intermediate between the outermost ring and first ring 416, or intermediate between the outermost ring and the vessel wall 404.

In the embodiment shown in FIG. 6, first ring 416 may comprise a first metal that is compatible with vessel 402 and capable of surviving the high temperature environment at the surface of the vessel for extended periods of time without significant degradation. For example, first ring 416 may comprise a precious metal, such as a platinum group metal or alloys thereof, and in some examples may include the same precious metal as vessel wall 404. All of first ring 416 may be formed of the same metal, or first ring 416 may include different metals. Such different metals may include alloys of the same elements but in different proportions. First ring 416 further includes a width W1. Width W1 may be constant, or W1 may vary as a function of angular position around vessel 402. In the embodiment illustrated in FIG. 6, W1 varies as a function of the angular position about vessel 402. First ring 416 may comprise a smoothly curved and continuous outer perimeter (edge).

Second ring 418 is spaced apart from wall 404 of vessel 402 and can comprise a metal different from the metal or metals used in the manufacture of first ring 416. For example, while first ring 416 can be formed from a precious metal, including the platinum group metals or alloys thereof, second ring 418 can be formed from a less expensive electrical conductor, such as for example and not limitation, nickel, copper, molybdenum or alloys thereof. Second ring 418 further includes a width W2. Width W2 may be constant, or width W2 may vary as a function of angular position around vessel 402. In the embodiment shown in FIG. 6, W2 varies as a function of angular position about vessel 402.

Flange 400 illustrated in FIG. 6 is identical to flange 300 depicted in FIG. 5 except that FIG. 5 illustrates an embodiment of a flange wherein the angle α produced by first portion 322 (angle between lines 336 and 338) is greater than the angle θ of sub-portion 332a and sub-portion 332b between lines 340 and 342, wherein the foregoing lines touch their respective sub-portions at only a single point as in the previous examples. FIG. 6 specifically shows an embodiment wherein the angle α produced by first portion 422 (angle between radial lines 436 and 438) of first ring 416 is less than the angle θ between sub-portions 432a and 432b of first ring 416 between lines 440 and 442 extending infinitely outward from and perpendicular to longitudinal axis 408, wherein the foregoing lines touch their respective sub-portions at only a single point). Accordingly, in the embodiment of FIG. 5, sub-portion 332a (and 332b) contacts vessel wall 304, whereas in the embodiment of FIG. 6, sub-portions 432a and 432b do not contact the wall 404 of vessel 402.

Figure 7:
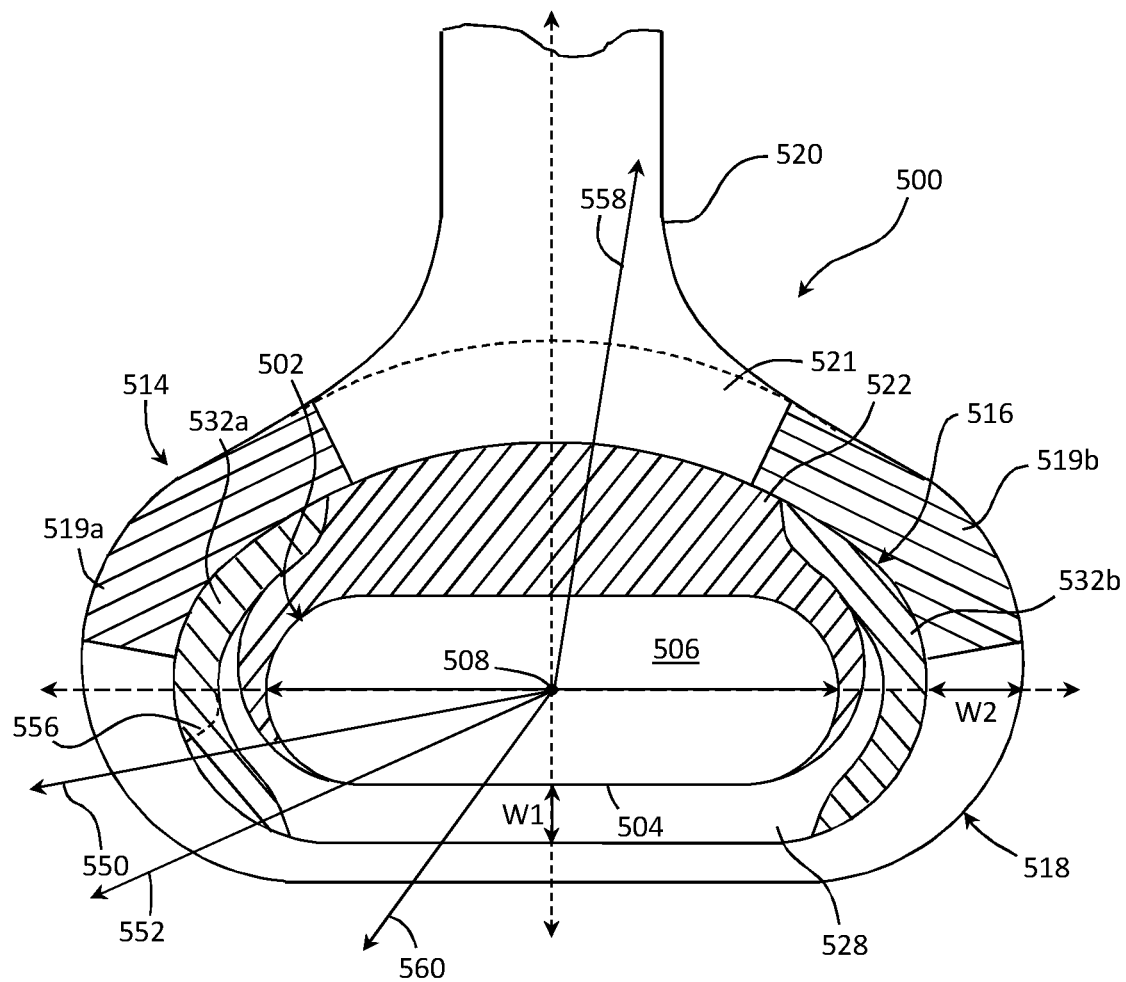
FIG. 7 is a side view of another example flange according to embodiments described herein.

In another embodiment illustrated in FIG. 7, another example flange 500 is shown attached to a vessel 502. Vessel 502 may be any one of the vessels comprising downstream glass manufacturing apparatus 30 described above, including first, second and third conduits 32, 38 and 46, fining vessel 34, mixing vessel 36, delivery vessel 40, exit conduit 44 and inlet 50, or any other metallic vessel that conveys molten glass and comprises glass manufacturing apparatus 10. Vessel 502 includes a wall 504 defining an interior volume 506. Vessel 502 further includes a central longitudinal axis 508 extending along a length of the vessel, and a cross sectional shape in a plane of the flange perpendicular to longitudinal axis 508. The cross sectional shape may vary in both shape and size as a function of position along the length of the vessel, but is shown as an oblong shape in the example of FIG. 7. The oblong cross sectional shape may be oval, elliptical, rectangular or a combination of these or other shapes. For example, the oblong cross sectional shape illustrated in FIG. 7 comprises a generally rectangular shape with two arcuate end portions, such as two semicircular end portions.

Flange 500 is similar to flanges 100, 200, 300 and 400, and comprises a body portion 514 including a first ring 516 and a second ring 518, and an electrode portion 520 attached to an outermost ring. Accordingly, the foregoing description of flanges 200, 300 and 400 in respect of their major components can be applied to flange 500. Second ring 518 may, in some examples, be the outermost ring wherein electrode portion 520 may be directly coupled to second ring 518 as shown. For example, electrode portion 520 may be integral with second ring 518 and formed therewith. In some examples electrode portion 520 may be separately formed and attached to the outermost ring, e.g. second ring 518, such as by welding. First ring 516 may, in some embodiments, be the innermost ring and in intimate contact with vessel wall 504.

In the embodiment shown in FIG. 7, first ring 516 may comprise a first metal that is compatible with vessel 502 and capable of surviving the high temperature environment at the surface of the vessel for extended periods of time without significant degradation. For example, first ring 516 may comprise a precious metal, such as a platinum group metal or alloys thereof, and in some examples may include the same precious metal as vessel wall 504. All of first ring 516 may be formed of the same metal, or first ring 516 may include different metals. Such different metals may include alloys of the same elements but in different proportions. First ring 516 further includes a width W1. Width W1 may be constant, or W1 may vary as a function of angular position around vessel 502 relative to longitudinal axis 508. First ring 516 may comprise a smoothly curved and continuous outer perimeter (edge).

Second ring 518 is spaced apart from wall 504 of vessel 502 and can comprise a metal different from the metal or metals used in the manufacture of first ring 516. For example, while first ring 516 can be formed from a precious metal, including the platinum group metals or alloys thereof, second ring 518 can be formed from a less expensive electrical conductor, such as for example and not limitation, nickel, copper and alloys thereof. Second ring 518 further includes a width W2. Width W2 may be constant, or width W2 may vary as a function of angular position around vessel 502.

In some embodiments, a thickness of the outermost ring may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring 520 are thicker than other regions of the outermost ring. For example, portions 519a,b of the outermost ring of the embodiment of FIG. 7, which in the illustrated embodiment is also second ring 518, may be thicker than portion 521 of the outermost ring positioned directly between electrode portion 520 and first ring 516. For example, portions 519a and 519b may be up to or greater than 50% thicker than portion 521, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions of the outermost ring aid in steering the electric current around a circumference of the vessel and minimize, such as eliminate, the formation of hot spots on the outermost ring near electrode portion 520. Such overheating can occur because electric current density is high in and around the electrode portion. The thicker portions of the outermost ring near electrode portion 520, but not directly between electrode portion 520 and first ring 516, present an increased cross sectional area and therefore provide for a reduced current density. Thus, a portion of the outermost ring near electrode portion 520 can be thicker than other portions of the outermost ring, for example a portion of the outermost ring adjacent the electrode portion. As described supra, the outermost ring may be second ring 518. However, in other embodiments, second ring 518 may be a ring intermediate between the outermost ring and first ring 516, or intermediate between the outermost ring and vessel wall 504.

In the instance where first ring 516 is an innermost ring, an inner edge of first ring 516 can be attached to vessel wall 504 and extend in a closed loop around vessel 502. For example, the inner edge of first ring 516 may be welded to vessel wall 504. Similarly, in the example illustrated in FIG. 7, an inside edge of second ring 518 can be attached to an outside edge of first ring 516. In other examples, intervening portions, for example intervening additional rings, may be positioned between first ring 516 and second ring 518. Moreover, additional rings may be positioned outside of second ring 518 or inside first ring 516 such as between first ring 516 and vessel wall 504.

Similar to the embodiments of FIGS. 5 and 6 (flanges 300 and 400), first ring 516 may comprise at least three portions, a first portion 522, a second portion 528 and a third portion divided into two sub-portions 532a and 532b having, respectively, three thicknesses T1, T2 and T3. None of the three portions extend completely around vessel 502. Sub-portions 532a and 532b may be oppositely and symmetrically positioned. Flange 500 differs from flanges 300 and 400 at least in that a portion of second portion 528 is positioned between sub-portions 530a and 530b and first portion 522. Accordingly, there is at least one line 550 extending infinitely outward from and perpendicular to longitudinal axis 508 in a plane of flange 500 that extends separately across all three portions 522, 528 and sub-portions 532a and 532b. There is also at least one line 552 extending infinitely outward from and perpendicular to longitudinal axis 508 in a plane of flange 500 that extends across only two of the portions, i.e. second portion 528 and one of sub-portion 532a or 532b. One may readily observe from FIG. 7 that other flange configurations are also possible, such as shortening the angular extent of sub-portions 532a (e.g., by truncating sub-portion 532a at dashed line 556) such that there exists a line extending from longitudinal axis 508 (e.g. line 550) that would extend only across first and second portions 522 and 528. It should be readily apparent that such shortening may also be performed in respect of sub-portion 532b.

It should further be apparent with the aid of FIG. 7 and the foregoing description that there is at least one line 558 extending infinitely outward from and perpendicular to longitudinal axis 508 in a plane of flange 500 that, in respect of first ring 516, crosses a width of only first portion 522 and neither second portion 528 nor sub-portions 532a or 532b. Line 558 may further intersect electrode portion 520. Similarly, there is at least one line 560 extending infinitely outward from and perpendicular to longitudinal axis 508 in a plane of flange 500 that, in respect of first ring 516, crosses only second portion 528 and neither first portion 522 nor sub-portions 532a or 532b.

Figure 8:
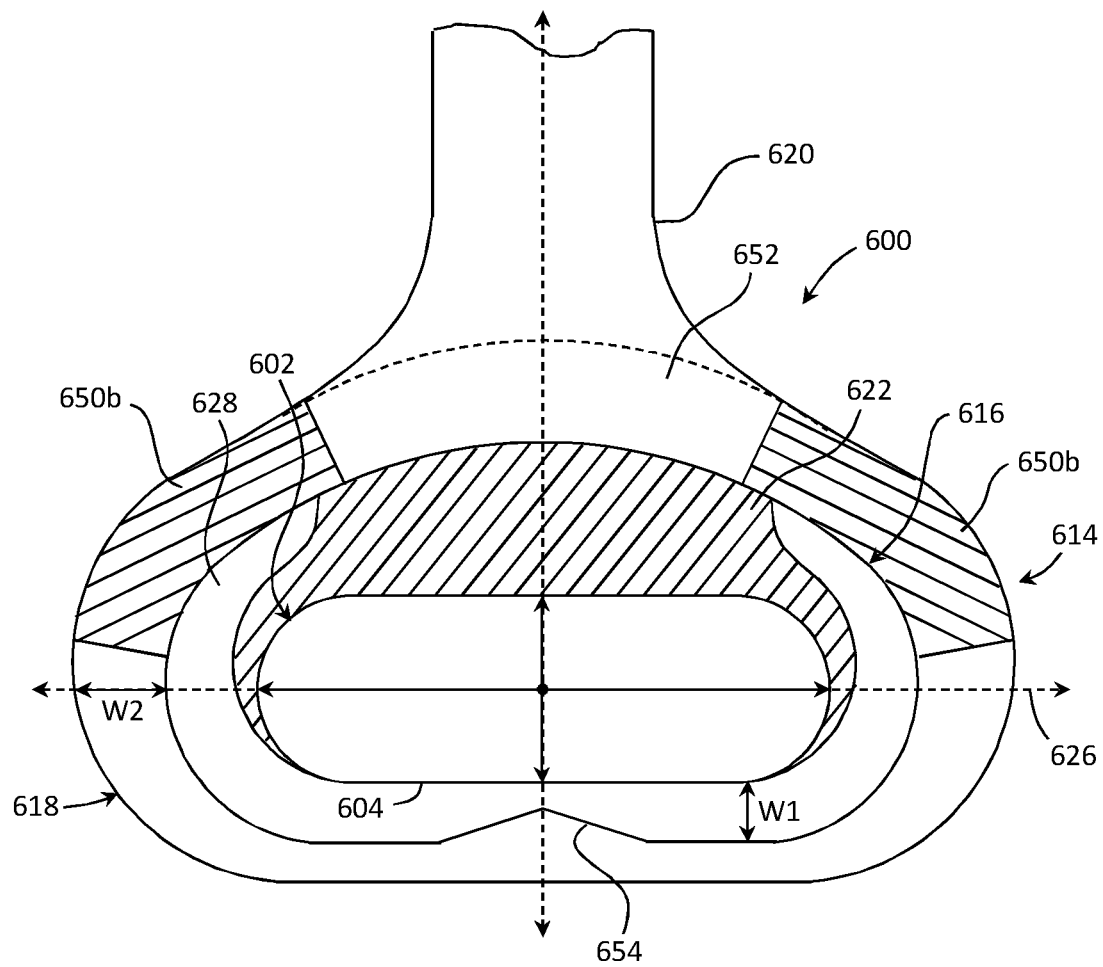
FIG. 8 is a side view if yet another example flange according to embodiments described herein.

Flange 600, shown in FIG. 8 is similar to flanges 100, 200, 300, 400 and 500, and comprises a body portion 614 including a first ring 616 and a second ring 618, and an electrode portion 620 attached to an outermost ring. Accordingly, the foregoing descriptions of flanges 100, 200, 300, 400 and 500 in respect of their major components can be applied to the flange of FIG. 8, where appropriate. Second ring 618 may, in some examples, be the outermost ring wherein electrode portion 620 may be directly coupled to second ring 618, as shown. For example, electrode portion 620 may be integral with second ring 618 and formed therewith. In some examples electrode portion 620 may be separately formed and attached to the outermost ring, e.g. second ring 618, such as by welding. First ring 616 may be the innermost ring and in intimate contact with wall 604 of vessel 602.

In the embodiment shown in FIG. 8, first ring 616 may comprise a first metal that is compatible with vessel 602 and capable of surviving the high temperature environment at the surface of the vessel for extended periods of time without significant degradation. For example, first ring 616 may comprise a precious metal, such as a platinum group metal or alloys thereof, and in some examples may include the same precious metal as vessel wall 604. All of first ring 616 may be formed of the same metal, or first ring 616 may include different metals. Such different metals may include alloys of the same elements but in different proportions. First ring 616 further includes a width W1. Width W1 may be constant, or may vary as a function of angular position around vessel 602. First ring 616 may comprise a smoothly curved and continuous outer perimeter.

Additionally, first ring 616 comprises a first portion 622 and a second portion 628 corresponding, for example, to portions 222 and 228 of flange 200, respectively.

Second ring 618 is spaced apart from wall 604 of vessel 602 and accordingly second ring 618 can comprise a metal different from the metal or metals used in the manufacture of first ring 616. For example, while first ring 616 can be formed from a precious metal, including the platinum group metals or alloys thereof, second ring 618 can be formed from a less expensive electrical conductor, such as nickel, copper or molybdenum. Second ring 618 further includes a width W2. Width W2 may be constant, or width W2 may vary as a function of angular position around vessel 602.

In some embodiments a thickness of the outermost ring may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring near electrode portion 620 are thicker than other regions of the outermost ring. For example, portions 650a,b of the outermost ring of the embodiment of FIG. 8, which in the illustrated embodiment is also second ring 618, may be thicker than portion 652 of the outermost ring (directly between electrode portion 620 and first ring 616. For example, portions 650a and 650b may be up to or greater than 50% thicker than portion 652, for example in a range from about 25% thicker to about 75% thicker, such as in a range from about 30% thicker to about 70% thicker, in a range from about 35% thicker to about 60% thicker or in a range from about 40% thicker to about 55% thicker. The thicker portions 650a,b of the outermost ring aid in steering the electric current around a circumference of the vessel and minimize, such as eliminate, the formation of hot spots on the outermost ring near electrode portion 620. Such overheating can occur because electric current density is high in and around the electrode portion. The thicker portions of the outermost ring near electrode portion 620 but not directly between electrode portion 620 and first ring 616 present an increased cross sectional area and therefore a reduced current density. Thus, a portion of the outermost ring adjacent electrode portion 620 can be thicker than other portions of the outermost ring, for example a portion of the outermost ring adjacent the electrode portion. As described supra, the outermost ring may be second ring 618. However, in other embodiments, second ring 618 may be a ring intermediate between the outermost ring and first ring 616, or intermediate between the outermost ring and vessel wall 604.

In the instance where first ring 616 is an innermost ring, an inner edge of first ring 616 can be attached to vessel wall 604 and extend in a closed loop around vessel 602. For example, the inner edge of first ring 616 may be welded to vessel wall 604. Similarly, in the example illustrated in FIG. 8, an inside edge of second ring 618 can be attached to an outside edge of first ring 616. In other examples, intervening portions, for example intervening additional rings, may be positioned between first ring 616 and second ring 618. Moreover, additional rings may be positioned outside of second ring 618 or inside first ring 616, such as between first ring 616 and vessel wall 604.

In the embodiment of FIG. 8, first ring 616 includes a notch 654 in an outer edge thereof to further aid in directing electrical current, the notch being located on the opposite side of horizontal line 626 from electrode portion 620. Moreover, any of first rings 114, 216, 316, 416 or 516 previously described may comprise a notch, which comprises a cutout portion on the opposite side of the first ring from, respectively, electrode portions 120, 220, 320, 420 and 520 relative to horizontal line 124, 226, 326, 426, 526. In the embodiment illustrated in FIG. 8, notch 654 is a V-shaped cutout, although in further embodiments notch 654 could be other shapes, for example a rectangular shape.

Figure 9:
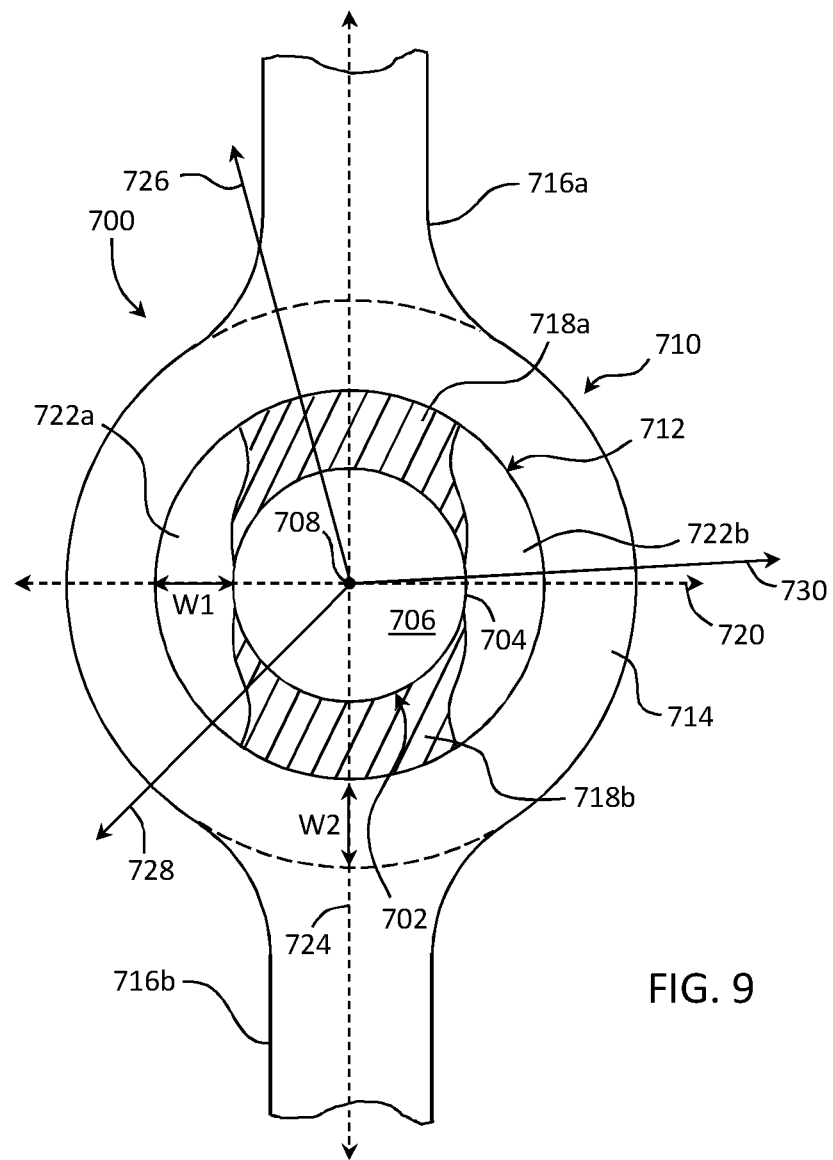
FIG. 9 is a side view of a another example flange according to embodiments described herein.

Shown in FIG. 9 is a cross sectional view of an example flange 700 attached to a vessel 702. Vessel 702 may be, for example, any one of the metallic vessels comprising downstream glass manufacturing apparatus 30 between the melting furnace and the forming body described above, including first, second and third conduits 32, 38 and 46, fining vessel 34, mixing vessel 36, delivery vessel 40, exit conduit 44 and inlet 50, or any other metallic vessel that conveys molten glass and comprises glass manufacturing apparatus 10. Vessel 702 is defined by a wall 704 that encloses an interior volume 706, and includes a central longitudinal axis 708 extending along a length of the vessel, and a cross sectional shape in a plane of the flange perpendicular to longitudinal axis 708. The vessel cross sectional shape may vary in both shape and size as a function of position along the length of the vessel, but is shown as a circular cross section in the example of FIG. 9. Accordingly, longitudinal axis 708 is located at the center of the circular cross section of the vessel.

Flange 700 comprises body portion 710 including first ring 712 and second ring 714. In the embodiment of FIG. 9, flange 700 comprises two electrode portions 716a and 716b attached to an outermost ring of body portion 710, wherein the two electrode portions are displaced by 180 degrees and positioned on opposite side of horizontal line 720. Second ring 714 may, in some examples, be the outermost ring wherein electrode portions 716a and 716b are directly coupled to second ring 714 as shown. For example, electrode portions 716a and 716b may be integral with the outermost ring and formed therewith. In some examples electrode portions 716a and 716b may be separately formed and attached to the outermost ring, e.g. second ring 714, such as by welding. As used herein, first ring 712 may be the innermost ring and in intimate contact with vessel 702.

In the embodiment shown in FIG. 9, first ring 712 comprises a first metal that is compatible with vessel 702 and capable of surviving the high temperature environment at an exterior surface of the vessel for extended periods of time without significant degradation. For example, first ring 712 may comprise a precious metal, such as a platinum group metal or alloys thereof, and in some examples may include the same precious metal as vessel 702. All of first ring 712 may be formed of the same metal, or first ring 712 may include different metals. First ring 712 further includes a width W1. In some embodiments width W1 may vary in respect of angular position about the first ring. In other embodiments, for example the embodiment of FIG. 9, width W1 may be substantially angularly constant.

Second ring 714 is spaced apart from wall 704 of vessel 702 and is positioned in a closed loop about first ring 712, and, being more distant from vessel wall 704 than first ring 712 and therefore exposed to a lower temperature than first ring 712, can comprise a metal different from the metal or metals used in the manufacture of first ring 712. For example, while first ring 712 can be formed from a precious metal, including platinum group metals or alloys thereof, second ring 714 can be formed from a less expensive electrically conducting metal, such as nickel, copper or molybdenum. Second ring 714 further includes a width W2. Width W2 may vary as a function of angular position relative to vessel 702, or W2 may be substantially constant. In some embodiments, an inner edge of second ring 714 can be joined directly to an outer edge of first ring 712 such as by welding.

First ring 712 extends in a closed loop around vessel 702 and, in the instance where first ring 712 is the innermost ring, first ring 712 may be attached to vessel 702 around an outer perimeter of vessel wall 704. For example, an inner edge of first ring 712 may be welded to an exterior surface of vessel wall 704. Similarly, in the example illustrated in FIG. 9, an inside edge of second ring 714 can be attached to an outside edge of first ring 712. In other examples intervening portions, for example intervening additional rings, may be positioned between first ring 712 and second ring 714. Moreover, additional rings, for example an outermost ring, may be positioned outside of second ring 714 or inside of first ring 712, for example between first ring 712 and vessel wall 704.

In some embodiments a thickness of the outermost ring may vary as a function of angular position about the vessel to which the flange is attached. For example, the outermost ring may be formed from nickel, copper, molybdenum or other metal less expensive and less temperature resistant than platinum or alloys thereof, wherein regions of the outermost ring near electrode portions 716a, 716b are thicker than other regions of the outermost ring. As described supra, the outermost ring may be second ring 714. However, in other embodiments, second ring 714 may be a ring intermediate between the outermost ring and first ring 712, or intermediate between the outermost ring and vessel wall 704.

As further illustrated by FIG. 9, first ring 712 may comprise two sub-portions 718a and 718b positioned on opposite sides of horizontal line 720 and include a thickness T1. Sub-portion 718a may extend around and be in contact with equal to or less than one half the overall perimeter of vessel 702. Similarly, sub-portion 718b may also be in contact with less than one half the overall perimeter of vessel 702. For example, in the embodiment of FIG. 9, both sub-portions 718a and 718b extend around vessel 702 less than one half the perimeter of the vessel and are therefore discrete sub-portions, where neither sub-portion extends completely around the perimeter of the vessel. It should be apparent that in some embodiments sub-portions 718a and 718b do not contact each other. For example, sub-portions 718a and 718b may be positioned adjacent their respective electrode portions 716a and 718b and vertical line 724 extending through and perpendicular to longitudinal axis 708 extends through both sub-portions. Sub-portions 718a and 718b may have the same thickness T1, or sub-portions 718a and 718b may have different thicknesses T1a and T1b, where T1b is different from T1a.

First ring 712 further comprises sub-portions 722a and sub-portion 722b. Sub-portions 722a and 722b may have the same thickness T2, or sub-portions 722a and 722b may have different thicknesses T2a and T2b, where T2b is different from T2a. Similar to sub-portions 718a and 718b, sub-portions 722a and 722b are separate and oppositely positioned around vessel 702. Also like sub-portions 718a and 718b, sub-portions 722a and 722b each extend less than 180 degrees around vessel 702. In some embodiments T1 is less than T2. In some embodiments T1a and T1b are equal, and T2a and T2b are equal and T1a, T1b are less than T2a, T2b. In some embodiments the material of each sub-portion may be selected to have different intrinsic electrical resistances.

It is apparent from FIG. 9 and the preceding description that sub-portions 718a, 718b and 722a, 722b are overlapping sub-portions relative to longitudinal axis 708. Accordingly, there is at least one line 726 extending infinitely outward from and perpendicular to longitudinal axis 708 that crosses one of sub-portion 718a or 718b without also crossing either one of sub-portion 722a or sub-portion 722b. There may also be at least one line 728 extending infinitely outward from and perpendicular to longitudinal axis 708 that crosses both one of sub-portion 718a or 718b and one of sub-portion 722a or sub-portion 722b. Finally, there is at least one radial line 730 extending infinitely outward from and perpendicular to longitudinal axis 708 in a plane of the flange that crosses one of sub-portion 722a or 722b without also crossing either one of sub-portion 718a or sub-portion 718b.

It should be clear to one skilled in the art, having the benefit of the foregoing disclosure, that many flange designs can be generated. In particular, a consistent design methodology can be envisioned wherein the electric current carrying capacity of the flange, as a function of angular position on the flange, can be tailored such that electric current is uniformly delivered to the vessel wall where the flange intersects (is attached to) that wall. Accordingly, in one such method, a first step comprises parameterizing an initial flange and vessel design. The initial flange and/or vessel design can be an existing physical flange and/or vessel, or the initial flange and/or vessel design can be a virtual design. By parameterize what is meant is to reduce the flange and/or vessel to the necessary parameter values that define the structure and its operating characteristics. For example, a simple, circularly symmetric flange having only a single ring attached to a vessel at an innermost edge of the ring, the vessel having a predetermined wall thickness, can be parameterized by such parameter values as, but not limited to, an outer radius defining the outer perimeter of the ring, an inner radius defining the inside edge of the flange, a thickness, and a material (itself defined at least by, for example, an electrical resistance), a wall thickness of the vessel and even a flow rate of molten material (e.g. molten glass) through the vessel. Such parameter values can be used to calculate for a predetermined electric current in the flange an electric current density at any point on or in the flange. The requisite calculations can be made, for example, with software designed or adapted for the task, such as electrical circuit analysis software. Additionally, the electric current density can be used to determine, for a predetermined flow rate of material through the vessel, a temperature of the flange or the vessel wall at a predetermined position. These calculated results can be compared to a desired electric current density and/or temperature. Flow and temperature fields can be calculated, for example, using ANSYS Fluent software.

Accordingly, the method may further comprise using the parameterized values, as well as, for example, a predetermined electric current supplied to the flange and in some examples the flow rate of material (e.g. molten glass) through the vessel, to calculate an electric current density in the flange and/or vessel, and/or a temperature in the flange and/or vessel. The calculated electric current density and/or temperature can be used as a basis for modifying the flange and/or vessel. For example, the initial design of the flange can be modified by changing at least one of, without limitation, a number of individual portions of a first ring of material comprising the flange, the thicknesses of the individual portions of the first ring, a shape of the individual portions of the first ring, a variation in width of the first ring, and intrinsic electrical resistance of one or more materials comprising rings or portions thereof, and so forth. When the changes have been made, the electric current density and/or the temperature at predetermined points on the flange and/or vessel can be recalculated and again compared to the desired difference in electric current density and/or temperature between regions of interest on the flange or vessel, for example a difference in electric current density and/or temperature between a top portion of the vessel and a side or bottom portion of the vessel. The electric current density and/or temperature at the predetermined points can also be compared to predetermined values, such as predetermined limits. The process of modifying and calculating can be iteratively applied until the desired difference in electric current density and/or temperature is achieved. Upon completion, the parameter values of the final design can be used to manufacture a flange and/or vessel exhibiting the final parameter values.

Example 1

Figure 10:
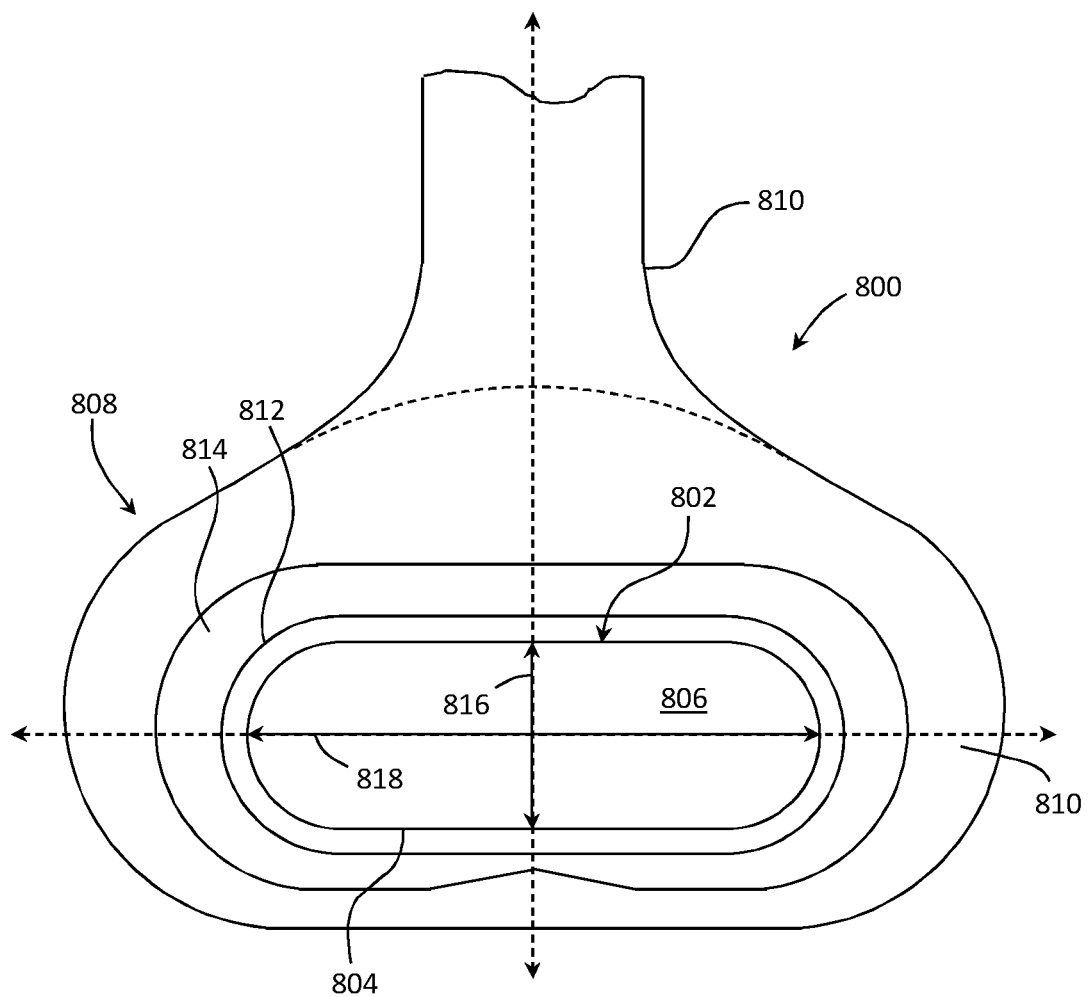
FIG. 10 is a side view of a conventional flange design.

Modeling was performed using FLUENT software and software developed for electrical circuit analysis to evaluate an empty (no molten glass) conventional flange 800 shown in FIG. 10, configured for an oblong vessel 802 comprising a wall 804 enclosing an inner volume 806, with a flange design in accordance with the flange of FIG. 4, i.e. flange 200. Vessel wall 804 had a constant thickness of 40 mil (approximately 50.8 cm). Conventional flange 800 included a body portion 808 and an electrode portion 810 extending therefrom. Body portion 808 included a nickel outermost ring 810 with a thickness of 0.5 inches (1.27 cm), and two platinum-rhodium rings of different thickness—an innermost ring 812 with a constant thickness 80 mil (approximately 0.41 cm) and an intermediate ring 814 positioned between the outermost ring 810 and vessel 802 and with a constant thickness of 40 mil (approximately 0.20 cm). Both platinum-rhodium rings 812 and 814 extended completely around vessel 802. The vessel 802 had a minor axis 816 of 6 inches (15.24 cm) and a major axis 818 of 20 inches (50.8 cm). Flange 800 did not comprise an equivalent first ring comprising multiple portions, for example multiple portions of different thickness. The flange in accordance with FIG. 4, flange 200, included a nickel outermost ring 218 and a platinum-rhodium innermost ring 216 comprising a first portion 222 with a constant thickness of 40 mil (approximately 0.20 cm) and a second portion 228 with a constant thickness of 80 mil (approximately 50.8 cm). Flange 200 was positioned about the same vessel 802. The flange included a single electrode portion 220.

In the modeling, both flanges were paired with a second flange of identical construction spaced 60 inches (152.4 cm) away and supplied with 10,000 amps. That is, flange 800 was paired with a second flange 800 and flange 200 was paired with a second flange 200. The modeling indicated a maximum temperature in the conventional flange 800 of 2030° C., well above the melting temperature of platinum (1768.3° C.). The maximum temperature occurred in the intermediate ring on a straight line between electrode portion 810 and the top of vessel 802. The maximum electric current density was 16 amps/mm$^2$ and occurred in the innermost ring 812 adjacent to the arcuate portions of vessel wall 804. The maximum temperature occurring in the nickel ring 810 was 1096° C.

In contrast to flange 800, flange 200 under the same conditions exhibited a maximum temperature of 1523° C. occurring in first portion 222 on a straight line between electrode portion 220 and the top of vessel 802. The maximum temperature was below the melting temperature of platinum. The maximum electric current density was 11 amps/mm$^2$, and occurred in the same location as for flange 800. The maximum temperature in the nickel outermost ring was 650° C.

Example 2

Figure 11:
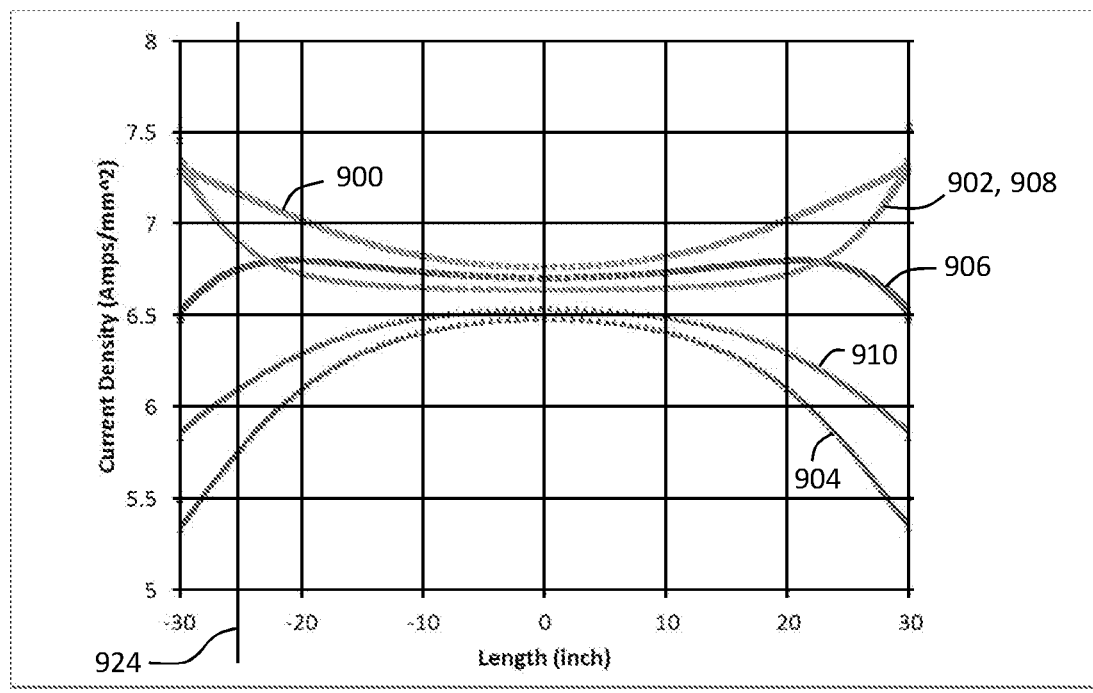
FIG. 11 is a graph showing a comparison of current density as a function of length for three separate positions in a wall of a vessel attached to a conventional flange vs. a flange according to embodiments described herein.

FIG. 11 shows modeled current density in flange 800 at three locations along a length of a vessel (conduit) with a supplied electric current of 12,000 amps/mm$^2$ compared with the electric current density for flange 200. The flanges 200 and 800 were again paired with an identical respective flanges on an oblong vessel (conduit) having a minor axis of 9 inches (approximately 22.9 cm) and a major axis of 30 inches (76.2 cm), with a spacing of 60 inches (152.4 cm) between the paired flanges. Current density was calculated at the top of the vessel, at the major axis (edge), and at the bottom of the vessel. Conventional flange 800 included a body portion 808 and an electrode portion 810 extending therefrom. Body portion 808 included a nickel outermost ring 810 with a thickness of 0.5 inches (1.27 cm), and two platinum-rhodium rings of different thickness—an innermost ring 812 with a constant thickness 80 mil (approximately 0.41 cm) and an intermediate ring 814 positioned between the outermost ring 810 and vessel 802 and with a constant thickness of 40 mil (approximately 0.20 cm). Both platinum-rhodium rings 812 and 814 extended completely around vessel 802. The vessel 802 had a minor axis 816 of 9 inches (22.9 cm) and a major axis 818 of 30 inches (76.2 cm). Flange 200 included a nickel outermost ring 218 with a thickness of 0.5 inches (1.27 cm) and a platinum-rhodium innermost ring 216 comprising a first portion 222 with a constant thickness of 40 mil (approximately 0.20 cm), a second portion 228 with a constant thickness of 80 mil (approximately 50.8 cm) and a single electrode portion 220. Flange 200 was positioned about the same vessel 802.

FIG. 11 shows that at the left side flange (position at −30 inches, 76.2 cm) the electric current density at the top of the vessel for the conventional flange design (curve 900) is approximately 7.3 amps/mm$^2$ and about 5.3 amps/mm2 at the bottom of the vessel (curve 904). At the edge of the vessel (curve 902) the electric current density is about 7.3 amps/mm$^2$. Over the distance between the flanges, 60 inches (152.4 cm) in this example, the electric current density varies approximately 0.55 amps/mm$^2$ (between about 7.3 amps/mm$^2$ and 6.75 amps/mm$^2$). Additionally, the electric current can be seen to be highest at the vessel-flange junction (i.e. −30 inches and +30 inches in the figure) and decreasing toward the midpoint between the flanges.

In comparison, the electric current density at the flange-vessel junction (e.g. −30 inches) at the top of the vessel for flanges 200 (curve 906), is only about 6.5 amps/mm$^2$, and about 5.8 amps/mm$^2$ at the flange-vessel junction (e.g. −30 inches) at the bottom of the vessel (curve 910). At the edge (side) of the vessel (curve 910) the electric current density is about 7.3 amps/mm$^2$. Thus, the maximum variation in electric current about a circumference of the vessel at the vessel-flange junction is about 1.5 amps/mm$^2$, indicating electric current being steered in a direction away from the top of the vessel.

More importantly, over the distance between the flanges the electric current density along the top of the vessel (curve 906) varies only approximately 0.26 amps/mm$^2$ (between about 6.76 amps/mm$^2$ and 6.5 amps/mm$^2$) for the same supplied electric current as for the conventional flange. This difference amounts to about 4% of the maximum electric current density at the top of the vessel. Moreover, as clearly seen in the figure, electric current density along the top of the vessel is lowest at the vessel-flange junctions (i.e. −30 inches and +30 inches) in contrast to the conventional flange, and increases to the maximum current density rapidly as one moves from one flange to the adjacent flange. In the illustrated example, the electric current density peaks very near the vessel-flange junction. In the present example the electric current density reaches a maximum within about 8 inches (20.32 cm) of a flange, or within about 13% of the total distance between adjacent flanges. Additionally, the electric current density is substantially constant between the peaks, locations at about −22 inches and +22 inches (a distance of 44 inches, 111.76 cm) in the example of FIG. 11, varying by no more than about 0.05 amps/mm$^2$.

Summarizing, for the same input electric current, a flange according to embodiments described herein is capable of significantly reducing the electric current density at the junction between the flange and the vessel wall at a point nearest the position of the electrode portion (where electric current is introduced into the flange body), e.g. the top of the vessel in the present example, when compared to a conventional flange, and is shown to produce a more consistent (uniform) electric current density along the top of the vessel over the distance between adjacent flanges.

Figure 12:
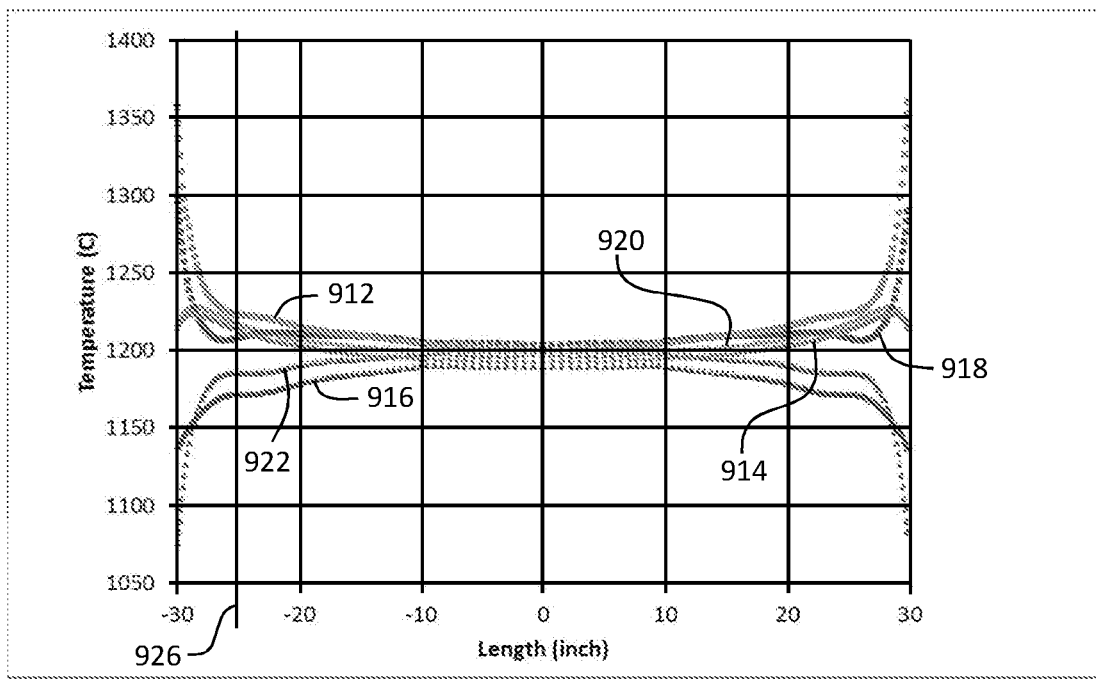
FIG. 12 is a graph showing a comparison of current density as a function of length for three separate positions in a wall of a vessel attached to a conventional flange vs. a flange according to embodiments described herein.

FIG. 12 shows modeled temperature for the same arrangement of flanges 800 and 200 at the same three locations along a length of a vessel (conduit) with a supplied electric current of 12,000 amps/mm$^2$. The flanges 200 and 800 were again paired with an identical respective flanges and the temperature was calculated at the top of the vessel (12 o'clock position), at the major axis (3 o-clock position), and at the bottom of the vessel (6 o'clock position). FIG. 12 shows that at the left side flange (position at −30 inches, 76.2 cm) the temperature at the top of the vessel (12 o'clock position) for the conventional flange design (curve 912) at the vessel-flange junction is approximately 1360° C. and about 1140° C. at the bottom (6 o'clock position) of the vessel (curve 916). At the side (3 o'clock position) of the vessel (curve 914) at the vessel-flange junction the temperature is about 1220° C.

In comparison, the temperature at the top (12 o'clock position) of the vessel at the vessel flange junction for flange 200 (curve 918), the temperature is approximately 1300° C. and about 1075° C. at the bottom of the vessel (curve 922). At the 3 o'clock position of the vessel (curve 920) at the vessel-flange junction the temperature is about 1220° C.

The data for FIGS. 11 and 12 show that a flange according to an embodiment of the present disclosure is capable of carrying high electric current (e.g., >8000 amps) without endangering the functionality of the vessel to which the flange is attached by re-distributing the electric current in the flange near the top of the vessel to other regions of the flange. Additionally, the data show that electric current distribution and temperature uniformity can be improved using a flange design as described in various embodiments herein. For example, at a position of about −25 inches (line 924 in FIG. 11), the electric current density about a circumference of the vessel employing conventional flanges (top, side and bottom) varies over a range from about 5.5 to about 7.25 amps/mm$^2$, a difference of about 1.75 amps/mm$^2$ or about 24.1%. For flange 200 the electric current density about a circumference of the vessel varies over a range from about 6.15 amps/mm$^2$ to about 6.75 amps/mm$^2$, a difference of about 0.6 amps/mm$^2$ or about 8.9%.

At a position of about −25 inches (line 926 in FIG. 12) on FIG. 12, the vessel temperature while employing conventional flange 800 varies about a circumference of the vessel over a range from about 1170° C. to about 1225° C., a difference of about 55° C. or about 5.5%. For flange 200 at the same location the temperature varies about a circumference of the vessel over a range from about 1180° C. to about 1210° C., a difference of about 30° C. or about 2.5%. Thus, while the data show the temperature nearing substantial uniformity at the center of the conduit (position 0) for both flange designs, a vessel employing flanges according to embodiments described herein can exhibit lower electric current density at the flange-vessel junction, particularly at a location nearest the electrode portion, and greater circumferential temperature uniformity nearer to the flanges, than the conventional flanges, and can maintain significant uniformity of electric current density and temperature over a considerable length of the vessel between flanges.

It will be apparent to those skilled in the art that various modifications and variations can be made to embodiments of the present disclosure without departing from the spirit and scope of the invention. Thus, it is intended that the present disclosure cover the modifications and variations of such embodiments provided they come within the scope of the appended claims and their equivalents.

What is claimed is:

1. An apparatus for processing a molten material comprising:
   a vessel comprising a wall, the vessel arranged to convey the molten material; and
   a flange attached to the vessel and configured to deliver an electric current to the vessel wall, the flange comprising a first ring extending completely around the vessel in a closed loop, the first ring comprising a first portion including a first thickness and a second portion including a second thickness different from the first thickness, the first portion and the second portion comprising overlapping edges in a plane of the flange such that the first portion is positioned between the second portion and the vessel wall, and neither the first portion nor the second portion extends completely around the vessel.

2. The apparatus according to claim 1, wherein the thickness of the first portion of the first ring is less than the thickness of the second portion of the first ring.

3. The apparatus according to claim 1, further comprising a second ring extending in a closed loop around the first ring.

4. The apparatus according to claim 3, wherein a thickness of the second ring is greater than the thickness of the second portion.

5. The apparatus according to claim 3, wherein the first ring comprises a first metal and the second ring comprises a second metal different from the first metal.

6. The apparatus according to claim 3, wherein the second ring is an outermost ring.

7. The apparatus according to claim 3, wherein the second ring comprises nickel.

8. The apparatus according to claim 1, wherein on a first line extending from and perpendicular to a centerline of the vessel in a plane of the flange, the first line crosses the first portion of the first ring without intersecting the second portion of the first ring.

9. The apparatus according to claim 8, wherein the first line is parallel to a minor axis of the vessel.

10. The apparatus according to claim 1, wherein the first ring further comprises a third portion positioned between the first portion and the second portion, wherein the third portion does not extend completely around the vessel.

11. The apparatus according to claim 1, wherein the molten material is molten glass.

12. The apparatus according to claim 1, wherein the first ring comprises platinum.

13. The apparatus according to claim 1, further comprising an outermost ring, wherein a thickness of the outermost ring varies as a function of angular position about the vessel.

14. The apparatus according to claim 1, wherein a cross sectional shape of the vessel in a plane perpendicular to a longitudinal axis of the vessel is oblong.

15. The apparatus according to claim 1, wherein the vessel is a fining vessel.

16. An apparatus for making glass comprising;
    a vessel comprising a wall;
    a flange attached to the vessel and configured to deliver an electric current to the vessel wall, the flange comprising:
      a first ring extending completely around the vessel and attached to the vessel wall in a closed loop, the first ring comprising a first portion including a first thickness and a second portion including a second thickness different from the first thickness, wherein the first portion and the second portion each extends around less than an entirety of the vessel and a line extending from and perpendicular to a centerline of the vessel in a plane of the flange crosses both the first portion and the second portion; and
      a second ring extending completely around the first ring in a closed loop.

17. The apparatus according to claim 16, wherein the first ring comprises a first metal and the second ring comprises a second metal different than the first metal.

18. The apparatus according to claim 16, wherein the first ring comprises a third portion including a third thickness different than the first and second thicknesses, and wherein the third portion does not extend completely around the vessel.

19. The apparatus according to claim 16, wherein the second ring contacts the first ring around an entire perimeter of the first ring, and wherein both the first portion and the second portion contact the second ring.

20. The apparatus according to claim 16, wherein a cross sectional shape of the vessel in a plane perpendicular to a longitudinal axis of the vessel is oblong.

* * * * *